(12) United States Patent
Buttrick, Jr. et al.

(10) Patent No.: US 8,272,814 B2
(45) Date of Patent: Sep. 25, 2012

(54) STRINGER CRAWLER WITH ATTACHMENT MECHANISM

(75) Inventors: James N. Buttrick, Jr., Seattle, WA (US); Roger A. Gage, Marysville, WA (US); Paul G. Kostenick, Jr., Marysville, WA (US); Jesus Sanchez, Snohomish, WA (US); Dario I. Valenzuela, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/330,678

(22) Filed: Dec. 20, 2011

(65) Prior Publication Data

US 2012/0114439 A1    May 10, 2012

Related U.S. Application Data

(62) Division of application No. 12/202,630, filed on Sep. 2, 2008, now Pat. No. 8,100,611.

(51) Int. Cl.
  *B23B 47/28* (2006.01)
(52) U.S. Cl. ........ 408/115 R; 408/1 R; 408/97; 408/103
(58) Field of Classification Search .......... 408/1 R, 408/72 R, 77, 78, 88, 97, 103, 115 R, 241 G; B23B 49/02, 47/28
See application file for complete search history.

(56) References Cited

U.S. PATENT DOCUMENTS

| | | | | |
|---|---|---|---|---|
| 2,083,490 A | * | 6/1937 | Boker | 408/115 R |
| 2,838,966 A | * | 6/1958 | Campbell | 408/115 R |
| 2,949,798 A | * | 8/1960 | Berta, Jr. | 408/115 R |
| 3,019,675 A | * | 2/1962 | Cleveland | 408/104 |
| 4,599,018 A | * | 7/1986 | Woods | 408/1 R |
| 4,684,299 A | * | 8/1987 | Laliberte | 408/115 R |
| 4,850,763 A | * | 7/1989 | Jack et al. | 409/178 |
| 5,308,199 A | * | 5/1994 | Juang | 408/115 R |
| 5,743,684 A | * | 4/1998 | Rex | 408/115 R |
| 6,796,014 B2 | * | 9/2004 | Sarh | 29/407.09 |
| 8,100,611 B2 | * | 1/2012 | Buttrick et al. | 408/1 R |

FOREIGN PATENT DOCUMENTS

DE    4218982 A1  *  7/1993

* cited by examiner

*Primary Examiner* — Daniel Howell
(74) *Attorney, Agent, or Firm* — Novatech IP Law

(57) ABSTRACT

A crawler assembly includes an attachment mechanism that is removably attachable to a stringer. The stringer has a vertical web and a longitudinal axis. The crawler assembly includes a longitudinal slider that is engageable to the attachment mechanism and having a normalizing mechanism disposable in bearing contact against the vertical web for maintaining an orientation of the longitudinal slider relative to the stringer. The longitudinal slider is movable along a direction parallel to the longitudinal axis. The crawler assembly includes a lateral slider that is mountable to the longitudinal slider and is movable along a direction perpendicular to the longitudinal axis. The lateral slider includes a drill bushing. The longitudinal and lateral sliders cooperate to move the drill bushing to at least one predetermined hole location.

11 Claims, 20 Drawing Sheets

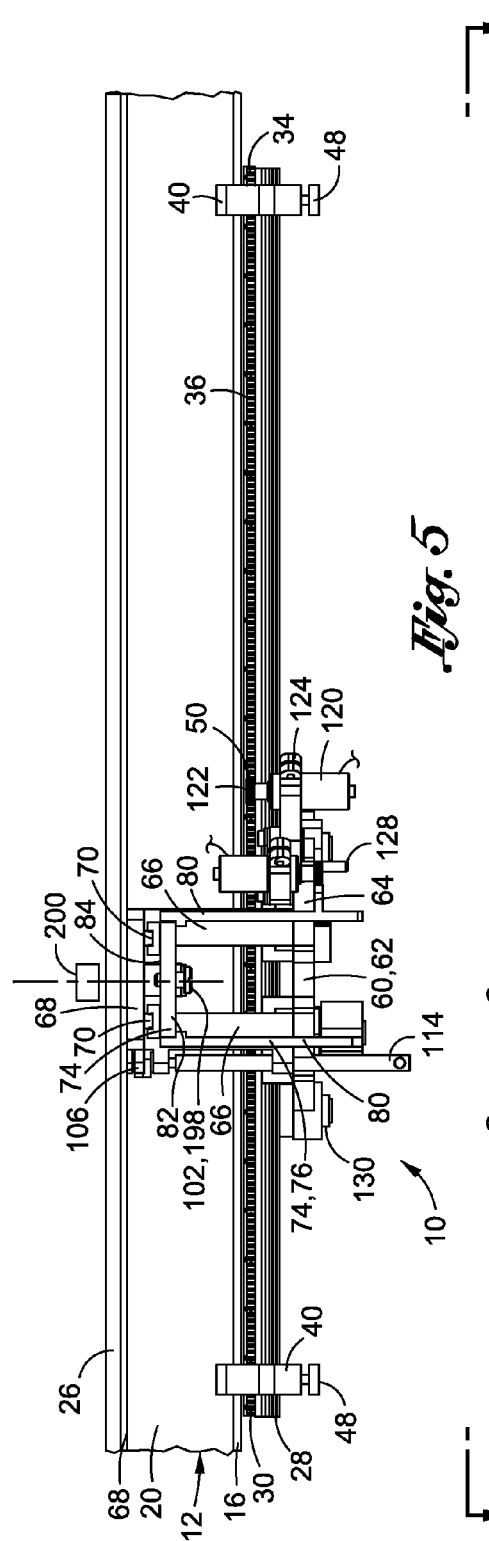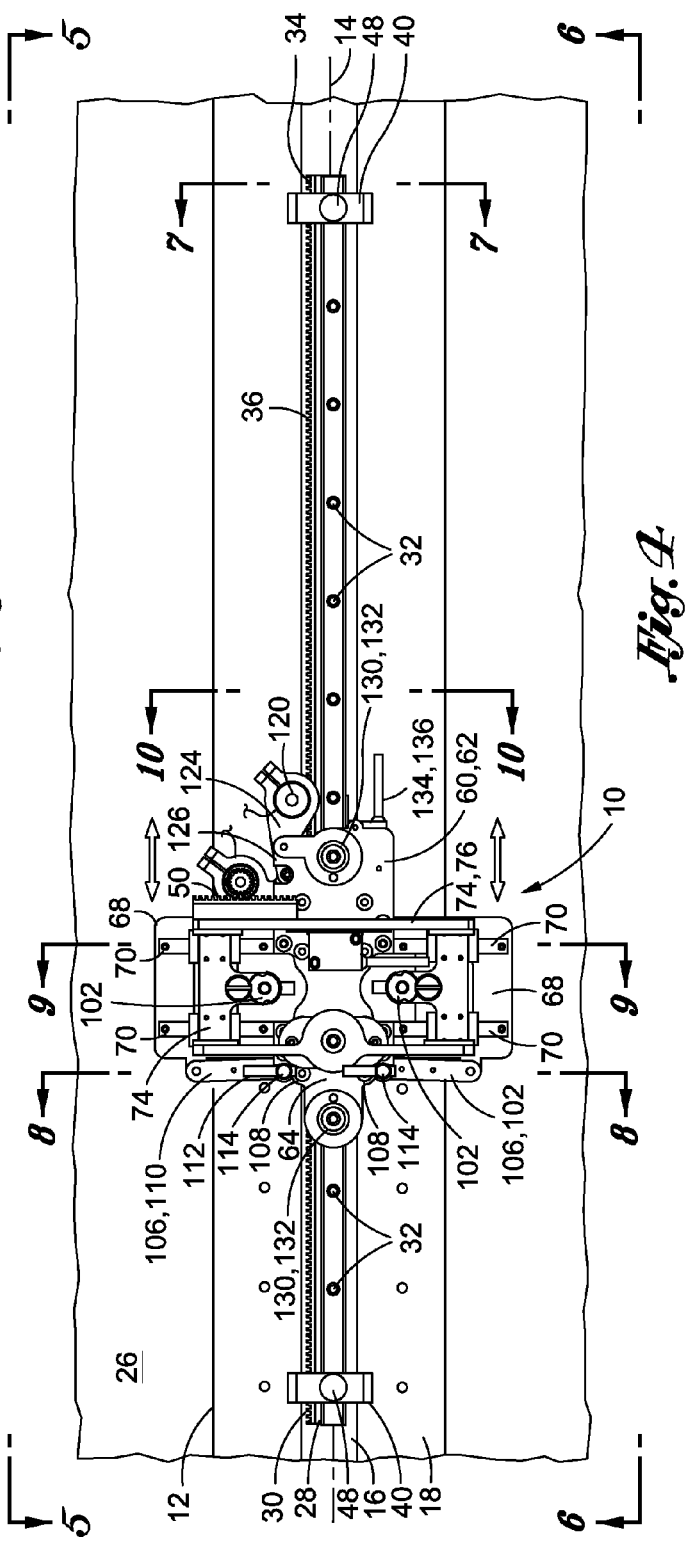

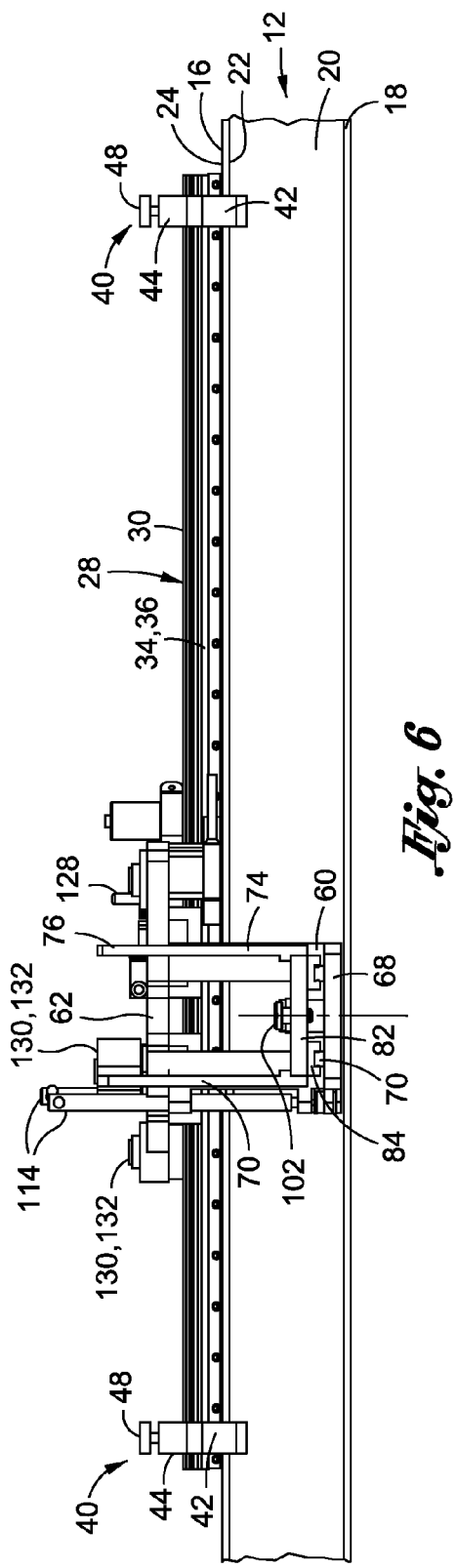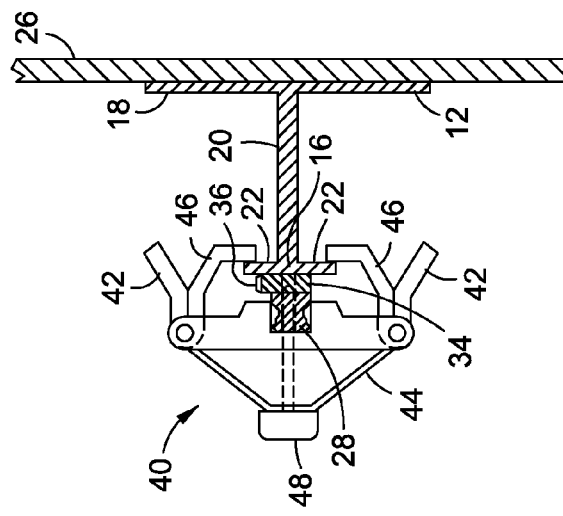

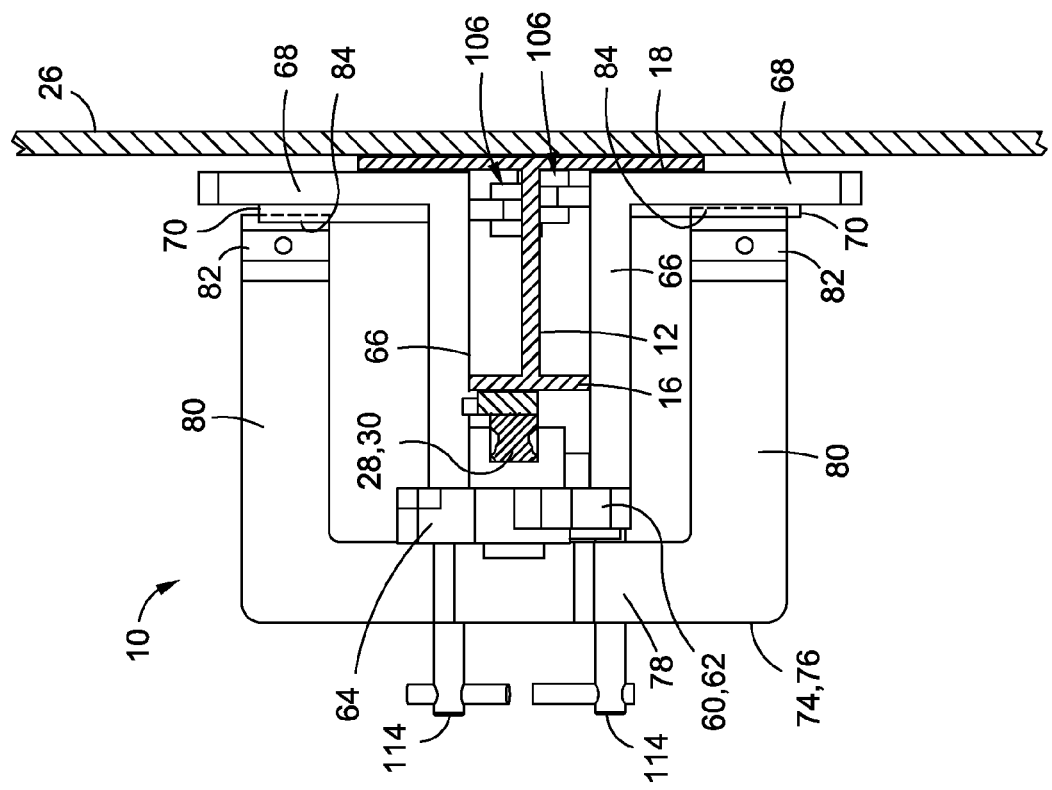
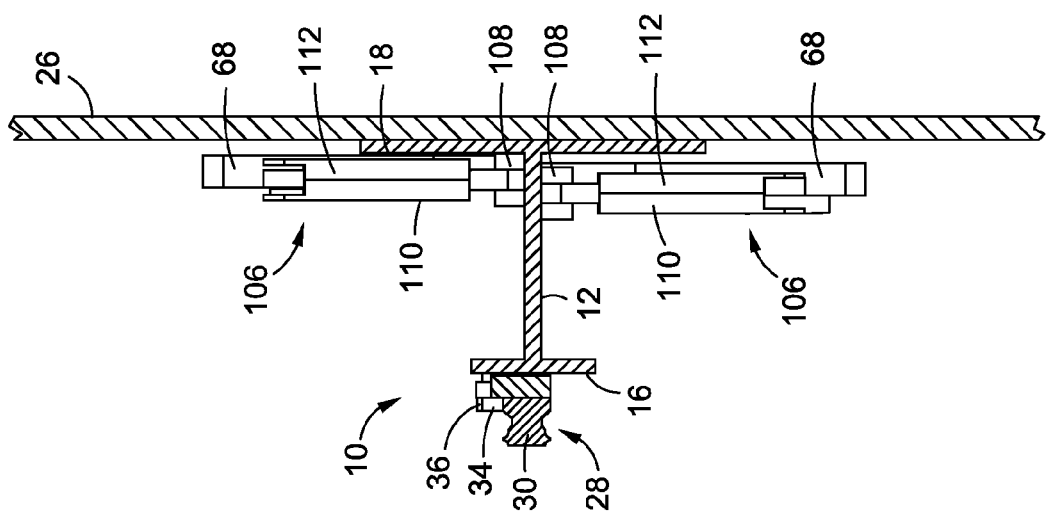

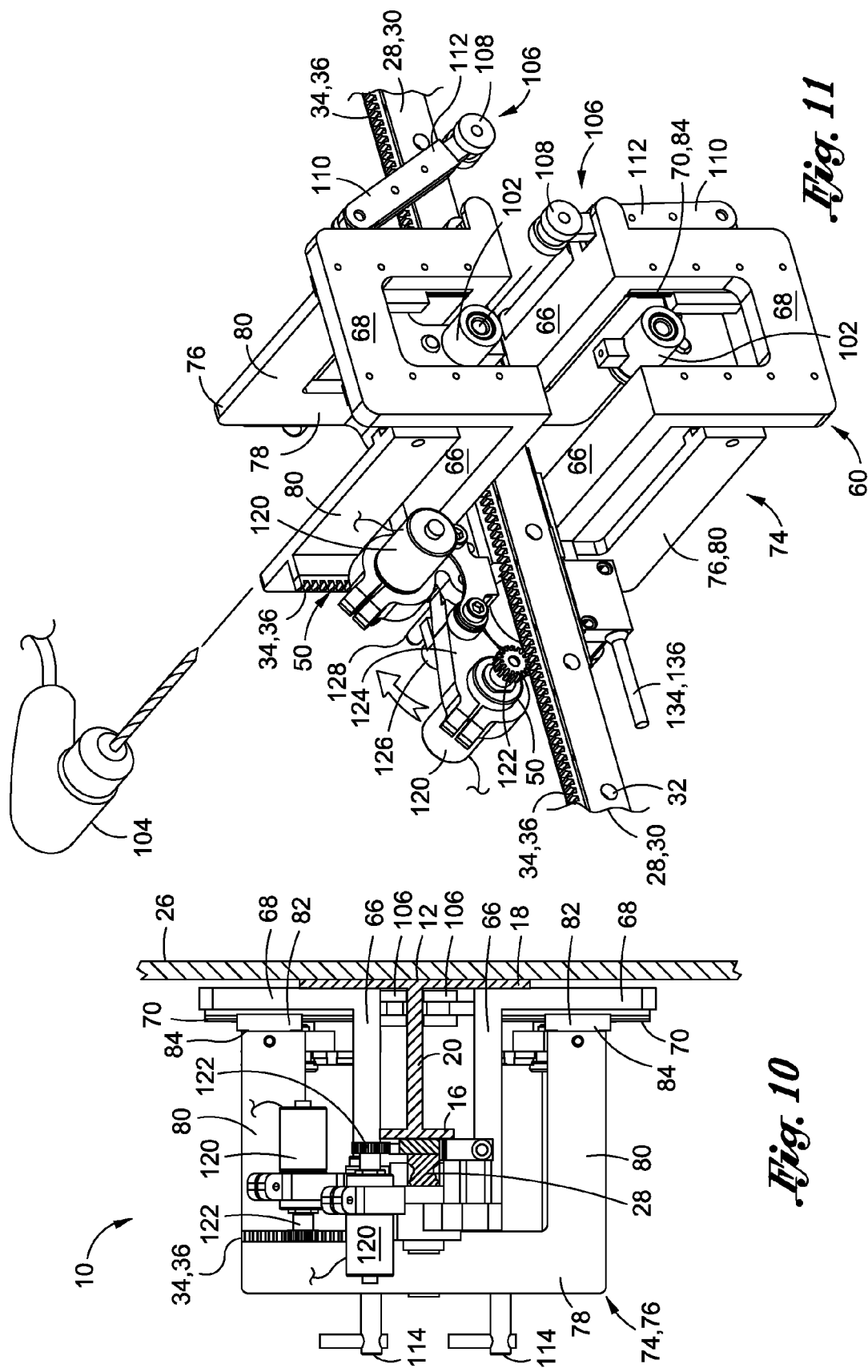

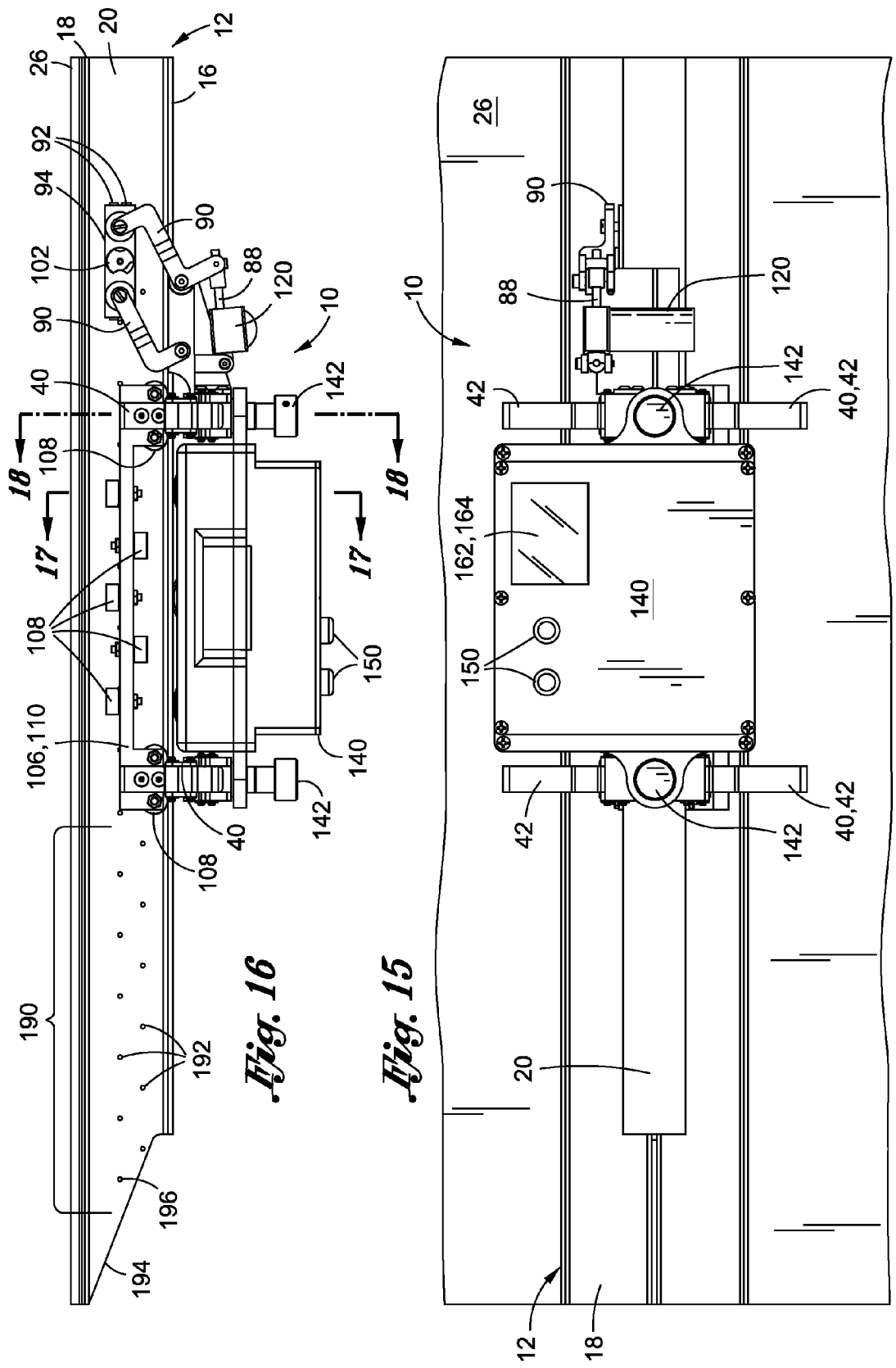

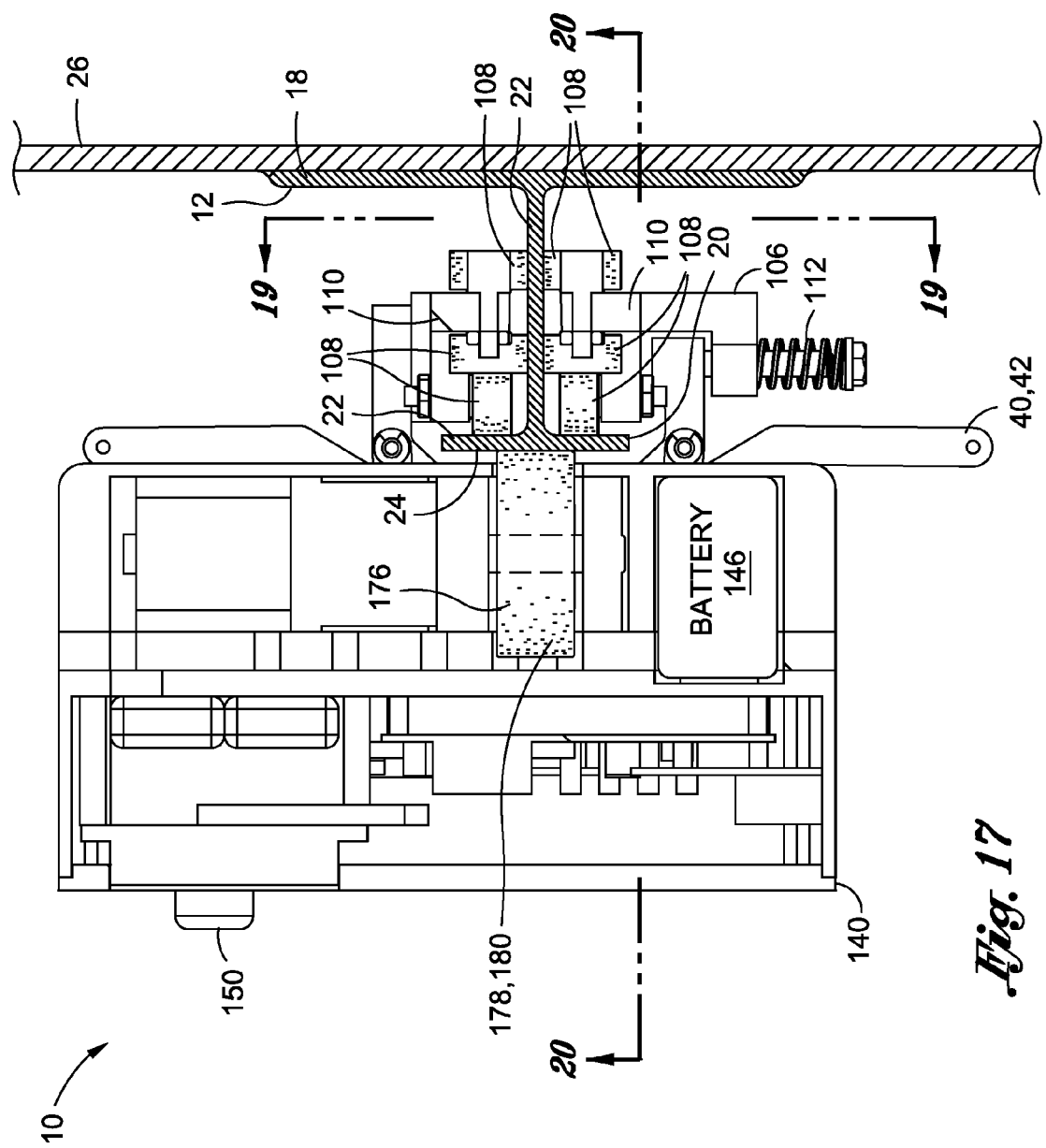

ly drilled in mating parts in order to facilitate mechanical attachment of the various components. For example, during aircraft assembly operations, wing skin panels may be mechanically fastened to substructure such as stiffeners and stringers. Holes must be drilled at spaced intervals along the joint between the stringer and the panel to allow installation of the mechanical fasteners.

STRINGER CRAWLER WITH ATTACHMENT MECHANISM

CROSS-REFERENCE TO RELATED APPLICATIONS

This application is a divisional of and claims priority to U.S. application Ser. No. 12/202,630 filed on Sep. 2, 2008 and entitled STRINGER CRAWLER, the entire contents of which is expressly incorporated herein by reference.

FIELD

The present disclosure relates generally to drilling fixtures and, more particularly, to a crawler assembly that is engageable to a stringer for drilling a pattern of holes.

BACKGROUND

In the production of various assemblies, a large quantity of fastener holes are typical The drilling of such fastener holes must typically be performed with a high degree of precision with respect to locational tolerances of the holes as well as with respect to hole orientation and hole size. Because of the relatively high degree of precision required for such fastener holes, it is typically the practice to drill such holes using an alignment tool or assembly fixture. Conventional alignment tools or assembly fixtures typically includes a plurality of drill bushings located at spaced intervals along a hole pattern. The drill bushings maintain alignment of a drill motor that is used to drill each of the holes in the hole pattern.

In an aircraft assembly production line, various assembly fixtures are used during the overall assembly of each production unit. For example, during wing assembly, assembly tools may be used to perform manufacturing operations on the wing skin panels and substructure. In any production line, it is typically desirable to improve production flow and reduce overall assembly time.

One way in which assembly time can be reduced in a production line is to perform certain operations in parallel with one another instead of performing all operations in sequence. Another way to improve production flow is to move certain operations off of main assembly tools to reduce the amount of time that each assembly tool is occupied by each production unit. As applied to operations involving the drilling of fastener holes, it may be desirable to perform certain drilling operations off of the main assembly tool thereby freeing the main assembly tool for other operations and avoiding time-consuming setup for drilling holes using a conventional drill jig or alignment tool.

As can be seen, there exists a need in the art for a system and method for drilling fastener holes in an assembly which improves overall production flow. Furthermore, there exists a need in the art for a system and method for drilling fastener holes in an assembly which can increase part flow and which is low in cost, simple in construction and easy to use.

SUMMARY

The above-described needs associated with drilling hole patterns is specifically addressed and alleviated by the embodiments disclosed herein. More specifically, provided is a self-contained crawler assembly which may be engageable to a stringer for positioning the crawler assembly therealong. The crawler assembly may be configured as a portable and/or battery-powered automated positioning device for positioning a drill bushing for use with a drill motor or automated drilling system at a plurality of predetermined hole locations of a hole pattern. The crawler assembly is specifically adapted for positioning the drill bushing at the predetermined hole locations with a high degree of positional and orientational accuracy such that a series of holes may be drilled in the stringer and/or in a panel to which the stringer may be fastened.

In one embodiment, the crawler assembly may be adapted to drill fastener holes though structure. For example, the crawler assembly may be adapted to drill disbond fastener holes or system bracket holes along a bond joint between stiffeners that may be bonded to wing skin panels. The crawler assembly may be adapted to engage or mount to the stringer and/or stiffener and may use various reference features such as pre-drilled holes (i.e., index holes), surface features (i.e., stringer or panel surfaces and edges) or other geometrical features for indexing the hole pattern. The crawler assembly may index to the reference feature and may be sequentially driven to any number of predetermined hole locations in a hole pattern by means of a computer numerical control (CNC) file and/or via hole pattern information otherwise provided to the crawler assembly (e.g., manually entered).

The technical effects of the disclosure include an improvement in hole locational accuracy, a reduction in cost and time conventionally associated with drilling holes in an assembly, and an increase in utilization of tooling fixtures that may be intended for other purposes. Furthermore, the crawler assembly may improve part flow in a production line by eliminating the need to use tooling that may otherwise be used for manufacturing operations. In addition, the crawler assembly facilitates the drilling of fastener holes without the need for time-consuming setup on a drill jig or fixture. In this regard, the crawler assembly may be used while the composite assembly is supported in a simple part-holding fixture or a transportation fixture such as a pickup stand.

In one embodiment, the crawler assembly may comprise an elongate attachment mechanism such as a rail preferably constructed of relatively stiff or rigid material. The attachment mechanism may be specifically adapted to be removably attachable to the stringer such as via a pair of clamping devices disposable along a length of the attachment mechanism such as at opposing ends of the attachment mechanism.

The crawler assembly may further include a longitudinal slider and a lateral slider. The longitudinal slider may be engageable to the attachment mechanism such as the rail and may be movable along a direction that is parallel to a longitudinal axis of the stringer via a drive mechanism (e.g., electric motor) mounted to the attachment mechanism (i.e., rail). The lateral slider may be configured to be mountable to the longitudinal slider and may be adapted to be movable in a direction that is perpendicular to the longitudinal axis of the stringer. In this regard, the longitudinal and lateral sliders are driven along their respective directions to sequentially position the drill bushing to at least one of a plurality of predetermined hole locations in a hole pattern.

In one embodiment, the longitudinal slider may include a normalizing mechanism which may establish and maintain a desired orientation of the crawler assembly relative to the stringer. For example, the normalizing mechanism may maintain a perpendicular orientation of the drill bushing relative to the stringer. In this regard, the normalizing mechanism may comprise an opposing pair of spring-loaded stringer rollers which may be disposed on opposing sides of a vertical web of the stringer and which may be biased thereagainst by means of compression springs or other suitable biasing mechanisms.

Although the stringer is described as having a vertical web, it should be noted that the vertical web may be provided in non-perpendicular relation to the stinger. More specifically, the vertical web of the stringer may be provided in any angular orientation and is further not limited to a planar or flat vertical web but may take non-planar cross-sectional shapes including curved shapes and complex angled shapes. Likewise, the various components that make up the crawler assembly (e.g., the normalizing mechanism, the clamping devices, the attachment mechanism or rail) are preferably configured to be complementary to the stringer to facilitate operation thereupon.

Each of the lateral and longitudinal sliders may preferably include the drive mechanism which, as was indicated above, may be an electric motor for moving the longitudinal and lateral sliders along their respective directions. The drive mechanisms may be operatively coupled to the longitudinal and lateral sliders by any suitable drive train configuration including, but not limited to, a rack and pinion drive train.

The drive train may include a rack disposable along a length of the rail and may comprise a series of gear teeth disposed linearly therealong. The pinion may comprise a cylindrical gear having teeth disposed circumferentially therearound and which are sized and configured complementary to the gear teeth formed along the rack. In one embodiment, the pinion may be configured to be disengagable from the rack such that the longitudinal slider and the lateral slider may each be selectively moved by manual repositioning to any desired location.

Toward this end, the longitudinal slider and lateral slider may each include a biasing mechanism such as a spring-loaded mechanism to bias the motor into and out of engagement with the motor drive train. Each of the drive mechanisms (i.e., motors) may be pivotably mounted to respective ones of the longitudinal and/or lateral sliders to facilitate manual disengagement thereof via a pivot arm.

The crawler assembly may optionally include a brake mechanism for braking the longitudinal and/or lateral sliders against movement in order to stop the drill bushing at the predetermined hole location. The brake mechanism for each of the longitudinal and lateral sliders may comprise at least one electromagnet which may be configured to magnetically engage a stationary metallic component such as the attachment mechanism (i.e., rail) and/or the lateral or longitudinal slider. Optionally, the brake mechanism may comprise a simple spring-loaded brake.

The crawler assembly may further include a controller which may be programmable with at least one hole pattern comprising a plurality of predetermined hole locations. The controller is operative to cause the drive and brake mechanisms to cooperate in moving the drill bushing toward the predetermined hole locations of the hole pattern and to stop the drill bushing upon arrival thereat.

Advantageously, the controller may include an operator interface to facilitate real-time programming of the crawler assembly via a keyboard, a touch screen, a keypad, pushbuttons or other suitable interface mechanisms. The controller may be operative to facilitate manual programming with a new hole pattern and allow for manual entry of coordinates of predetermined hole locations. The crawler assembly may optionally include positional feedback mechanisms such as linear encoders or rotary encoders which may be communicatively coupled to the controller to indicate the position of the drill bushing relative to an index feature and/or relative to the hole pattern.

In an alternative embodiment of the crawler assembly, a longitudinal friction drive may be provided to engage the stringer such as at an upper flange thereof. In this regard, the attachment mechanism (i.e., rail) as used in the above-described crawler assembly may be omitted. The crawler assembly with the a longitudinal friction drive may be frictionally engaged directly to the stringer such that the drill bushing is movable therealong by at least one or more drive rollers placed in rolling engagement with the stringer along an upper flange of the stringer. A rotary encoder may be communicatively coupled to the controller and preferably is operable independent of the drive rollers in order to maintain accuracy in positioning the drill bushing in the case of slippage of the drive roller.

The longitudinal friction drive may further include at least one and, more preferably, a pair of clamping devices disposed on opposing ends of the crawler assembly. Each one of the clamping devices may be engageable to the stringer via a plurality of stringer rollers. The stringer roller may be placed in rolling contact against an inner surface of the upper flange of the stringer and may be positioned opposite the drive roller(s). In addition, a portion of the stringer rollers may be disposable in bearing contact against opposing sides of the vertical web of the stringer to provide a normalizing mechanism to the longitudinal friction drive crawler assembly.

The clamping devices in combination with the drive rollers facilitates clamping of the crawler assembly to the vertical web and/or to the upper flange of the stringer. When the clamping devices are clamped, the stringer rollers are placed in bearing contact against the opposing sides of the vertical web to provide a normalizing feature to maintain the crawler assembly in a normal or perpendicular orientation relative to the stringer. The stringer rollers are also placed in bearing contact against the inner surface of the upper flange to maintain the drive roller in close contact with the stringer for frictional driving of the crawler assembly.

The friction drive crawler assembly preferably includes a controller having a microprocessor and other suitable electronic components such as an operator interface in order to effectuate movement of the longitudinal slider and lateral slider. The controller is communicatively coupled to the respective drive mechanisms and/or brake mechanisms and cause the drive mechanisms to move the drill bushing toward at least one of the predetermined hole locations and stop the drill bushing upon arrival thereat using the brake mechanism, if provided. However, for configurations where the drive wheel is directly coupled to the drive mechanism (i.e., coupled to the motor), the brake mechanism may be unnecessary for the longitudinal friction drive crawler configuration because the drive mechanism may be operative to provide both driving and braking forces to the drive roller.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 4 is a plan view of the crawler assembly and attachment mechanism engaged to the stringer;

FIG. 5 is a view taken along lines 5-5 of FIG. 4 illustrating a side view of the crawler assembly and attachment mechanism engaged to the stringer;

FIG. 6 is a view taken along lines 6-6 of FIG. 4 and illustrating a side view of the crawler assembly and attachment mechanism engaged to the stringer;

FIG. 7 is a cross-sectional illustration taken along lines 7-7 of FIG. 4 and illustrating a clamping device adapted for mounting the attachment mechanism to the stringer;

FIG. 8 is a cross-sectional view taken along lines 8-8 of FIG. 4 and illustrating a normalizing mechanism comprising a pair of stringer rollers engaged to opposite sides of a vertical web of the stringer;

FIG. 9 is a cross-sectional illustration taken along lines 9-9 of FIG. 4 and illustrating the interconnection of the lateral slider to the longitudinal slider at a base thereof;

FIG. 10 is a cross-sectional illustration taken along lines 10-10 of FIG. 4 and illustrating a drive mechanism or motor engaged to the lateral slider;

FIG. 11 is a perspective illustration of the crawler assembly taken from a lower side thereof;

FIG. 15 is a top view of the crawler assembly engaged to the stringer;

FIG. 16 is a side view of the crawler engaged to the stringer;

FIG. 17 is a cross-sectional view taken along lines 17-17 of FIG. 16 and illustrating a drive wheel of the electronics module frictionally engaged to the stringer;

DETAILED DESCRIPTION

Figure 1:
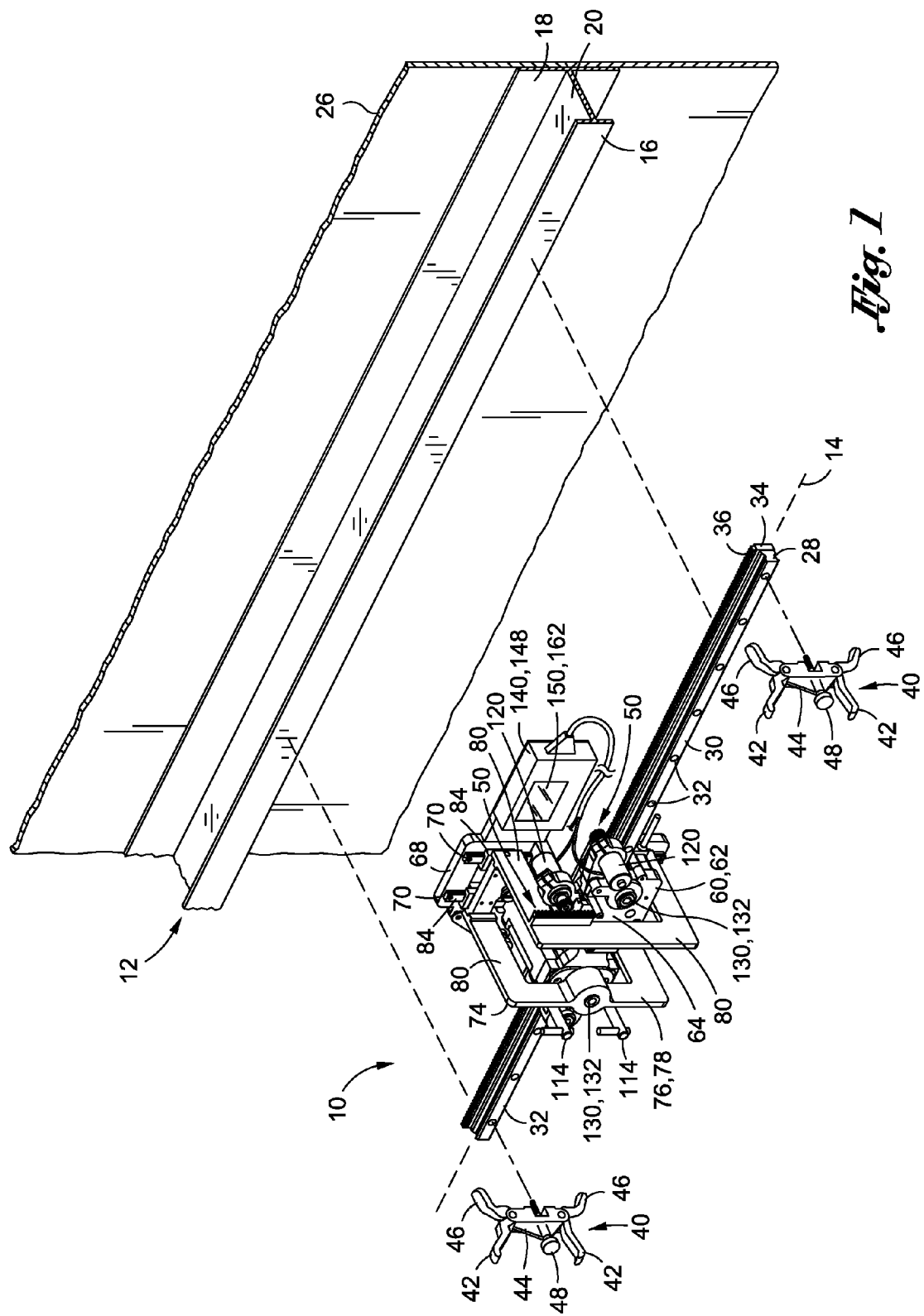
FIG. 1 is a perspective view of a crawler assembly which may be engageable to a stringer.

Referring now to the drawings wherein the showings are for purposes of illustrating preferred and various embodiments of the disclosure only and not for purposes of limiting the same, FIGS. 1-11 illustrate a crawler assembly 10 in one embodiment wherein the crawler assembly 10 is engageable to a stringer 12 using an elongate attachment mechanism 28 such as a rigid rail 30 which is removably attachable to the stringer 12. The crawler assembly 10 illustrated in FIGS. 1-11 may include a longitudinal slider 60 and a lateral slider 74. The longitudinal slider 60 may be engageable to the attachment mechanism 28. The lateral slider 74 may be engageable to the longitudinal slider 60. The longitudinal slider 60 and lateral slider 74 are movable along the attachment mechanism 28 for positioning a drill bushing 102 or automated drilling system (not shown) to at least one predetermined hole location 192 of a hole pattern 190 such that a hole may be drilled through the stringer 12 and/or through a panel 26 or other member that may be attached to the stringer 12.

FIGS. 12A-22 illustrate a crawler assembly 10 in a further embodiment having a longitudinal friction drive 176 for engaging the stringer 12. As opposed to the embodiment illustrated in FIGS. 1-11 wherein the longitudinal slider 60 is mounted to the attachment mechanism 28, the longitudinal friction drive 176 of the embodiment illustrated in FIGS. 12-22 is directly mounted to the stringer 12 and is frictionally driven therealong.

The longitudinal friction drive 176 cooperates with the lateral slider 74 to move the drill bushing 102 or automated drilling system to one or more predetermined hole locations 192 of the hole pattern 190. The automated drilling system may comprise an air motor (e.g., drill motor) or other suitable device mounted on the crawler assembly 10 and being adapted to drill a hole at the predetermined hole locations 192 when positioned thereat by the stringer crawler in a completely autonomous process.

Each of the embodiments illustrated in FIGS. 1-11 and in FIGS. 12A-22 comprise a two-axis hole location system which attaches to the upper flange 16 of the stringer 12. As can be seen, the stringer 12 may be configured as an I-shaped beam. However, the stringer 12 may be provided in any configuration, size and shape.

The crawler assembly 10 may be provided as a self-contained automated drill bushing 102 positioner preferably, but optionally, having its own power source 146 such as a battery. In one embodiment, the crawler assembly 10 may be adapted for drilling fastener holes in any assembly having a stringer such as a stringer/wing panel assembly. However, the crawler assembly 10 as disclosed herein may be utilized for performing a wide variety of machining operations and is not limited to locating a drill bushing 102 along a stringer/panel assembly. For example, the crawler assembly 10 may be used for drilling fastener holes in any type of metallic or nonmetallic structure. Furthermore, the crawler assembly 10 is not limited to locating the drill bushing 102 relative to a stringer 12 and panel 26 assembly but may also be used for locating the drill bushing 102 along a single component such as along the stringer 12 itself or along other components where a hole pattern 190 is desired.

Advantageously, the crawler assembly 10 as disclosed herein may use various reference features 194 such as pre-drilled index holes 196 or using various surface features of the stringer 12 and/or panel 26 as a starting point for positioning the drill bushing. As was mentioned, such reference features 194 may include pre-drilled holes that may be drilled in upstream processes and/or the reference features 194 may comprise various features of the stringer 12 itself including, but not limited to, various edges, sides, surfaces and other features of the stringer 12 and/or panel 26.

The stringer 12 may comprise lower and upper flanges 18, 16 interconnected by a vertical web 20 formed in an "I" shape. The upper flange 16 may include inner and outer surfaces 22, 24 wherein the inner surface 22 is located adjacent the vertical web 20 and the outer surface 24 is opposite the inner surface 22. The crawler assembly 10 may be configured to move the drill bushing 102 by indexing from a reference feature 194 such as the inner surface 22 of the upper flange 16 or from an index hole 196 that may be pre-drilled in the stringer 12 and/or panel 26.

The crawler assembly 10 may index (i.e., reposition the drill bushing) from the reference feature 194 in order to sequentially move the drill bushing 102 to a set of predetermined hole locations 192 that comprise the hole pattern 190. The hole pattern 190 may be provided as part of a computer numerical control (CNC) file for driving the crawler assembly 10 to predetermined hole locations 192 that make up the hole pattern 190. The crawler assembly 10 illustrated in FIGS. 1-11 utilizes the rigid attachment mechanism 28 (i.e., drive rail 30) while the crawler assembly 10 illustrated in FIGS. 12A-22 utilizes a friction drive in order to drive the drill bushing 102 to any one of a plurality of predetermined hole locations 192 of the hole pattern 190.

Referring more particularly now to FIGS. 1-11, shown is the crawler assembly 10 embodiment which is engageable to the stringer 12 via the attachment mechanism 28. As can be seen in FIG. 1, the crawler assembly 10 may include the attachment mechanism 28 which is removably attachable to the stringer 12 using at least one and, more preferably, a pair of clamping devices 40 which may be positionable at various locations along the attachment mechanism 28. The attachment mechanism 28 is adapted to be clamped to the stringer 12 such as to the upper flange 16 thereof. The crawler assembly 10 further comprises the longitudinal slider 60 and a lateral slider 74.

The longitudinal slider 60 is engageable to the attachment mechanism 28 and is movable along a direction parallel to the longitudinal axis 14 of the stringer 12. The lateral slider 74 may be mountable to the longitudinal slider 60 and is preferably movable in a direction perpendicular to the longitudinal axis 14. The lateral slider 74 may have a drill bushing 102 mounted thereon to facilitate the formation of holes through the stringer 12 and/or panel 26 using a tool such as a drill motor 104 as illustrated in FIG. 11.

However, it should be noted that the drill bushing 102 may be adapted for performing a variety of alternative machining operations other than drilling holes in the stringer 12 and/or panel 26. For example, the crawler assembly 10 as disclosed herein is adapted for positioning devices other than the drill bushing 102 and which may be provided in a variety of shapes, sizes, and configurations and which may be adapted for performing any number of machining operations or non-machining operations and is not solely limited to the drilling of holes according to a predetermined hole pattern 190.

Referring still to FIGS. 1-11, the crawler assembly 10 may further include a normalizing mechanism 106 which may maintain a desired or predetermined orientation of the crawler assembly 10 relative to the stringer 12. For example, the normalizing mechanism 106 may be adapted to maintain a normal or perpendicular orientation of the drill bushing 102 relative to the stringer 12 and/or panel 26. In one embodiment illustrated in FIG. 8, the normalizing mechanism 106 may comprise an opposing pair of stringer rollers 108 disposed on opposing sides of the vertical web 20 of the stringer 12.

Each one of the stringer rollers 108 of the normalizing mechanism 106 may be mounted to the longitudinal and/or lateral slider 60, 74 via a roller bracket 110. One or more of the roller brackets 110 may include a biasing mechanism 112 such as a compression spring disposed with the roller bracket 110 in order to provide a biasing force of the stringer roller 108 against opposing sides of the vertical web 20. In this manner, the normalizing mechanism 106 maintains a desired orientation of the crawler assembly 10 with respect to the vertical web 20 of the stringer 12.

In this regard, it should also be noted that the stringer 12 is not limited to the configuration shown in FIGS. 1-11 as was indicated above. For example, the stringer 12 may be provided in a variety of alternative shapes, sizes and cross-sections. For example, the stringer 12 may be provided in a "Z"-shaped cross-section, a hat-shaped cross-section, a "U"-shaped cross-section or any other variety of cross-sectional shapes. Furthermore, the vertical web 20 interconnecting a lower flange 18 of the stringer 12 to the upper flange 16 thereof may be disposed in a non-vertical orientation relative to the upper and lower flanges 16, 18.

For example, the vertical web 20 may be provided in an angled (i.e., non-perpendicular) orientation relative to the panel 26. The normalizing mechanism 106 may be configured to be complementary to the particular shape, size and configuration of the stringer 12 in order to facilitate a desired orientation of the drill bushing 102 relative to the panel 26. In this manner, drilling or other operations may be performed on the stringer 12 and/or panel 26 at any desired orientation.

In one embodiment shown in FIG. 8, the normalizing mechanism 106 may be provided as a pair of stringer rollers 108 disposed on opposing sides of the vertical web 20 of the stringer 12. The stringer rollers 108 may be mounted adjacent to a base 68 of the longitudinal slider 60. However, it is contemplated that the normalizing mechanism 106 may be provided in alternative configurations and is not limited to the orientations and positions shown in FIG. 8. In this regard, the stringer rollers 108 may be positioned at any location relative to the stringer 12 or any other feature which may provide a normalizing capability to the crawler assembly 10.

Referring particularly to FIG. 1, shown is the crawler assembly 10 disposed in spaced relation to the stringer 12. The elongate attachment mechanism 28 is removably attachable to the stringer 12 using at least one and, more preferably, a pair of clamping devices 40 which are shown in FIG. 1 as being disposed in spaced relation to one another along the attachment mechanism 28. Each of the clamping devices 40 is selectively positionable at desired locations along a length of the attachment mechanism 28 via a fastener 48 such as a thumb screw which engages any one of a plurality of bores 32 formed in the attachment mechanism 28 as best seen in FIGS. 1 and 2.

Referring briefly to FIG. 7, shown is the clamping device 40 in cross-section illustrating an opposing pair of clamp levers 42, each of which may be operatively coupled to a clamp arm 46 configured to engage the stringer 12 such as along an inner surface 22 of the upper flange 16. The clamp levers 42 may be operatively coupled attached to a clamp body 44 as shown in FIG. 7 and, in turn, may be operatively coupled to the clamp arms 46 such as by a pair of cam-shaped links that allow the clamping device 40 to lock into place when the clamp levers 42 are actuated or pivoted downwardly. Advantageously, the clamping devices 40 may be positioned at any location along the rail 30 wherever there exists a bore 32. Such configuration facilitates positioning the attachment mechanism 28 along the stringer 12 until an ideal location for the clamping devices 40 is found.

Figure 2:
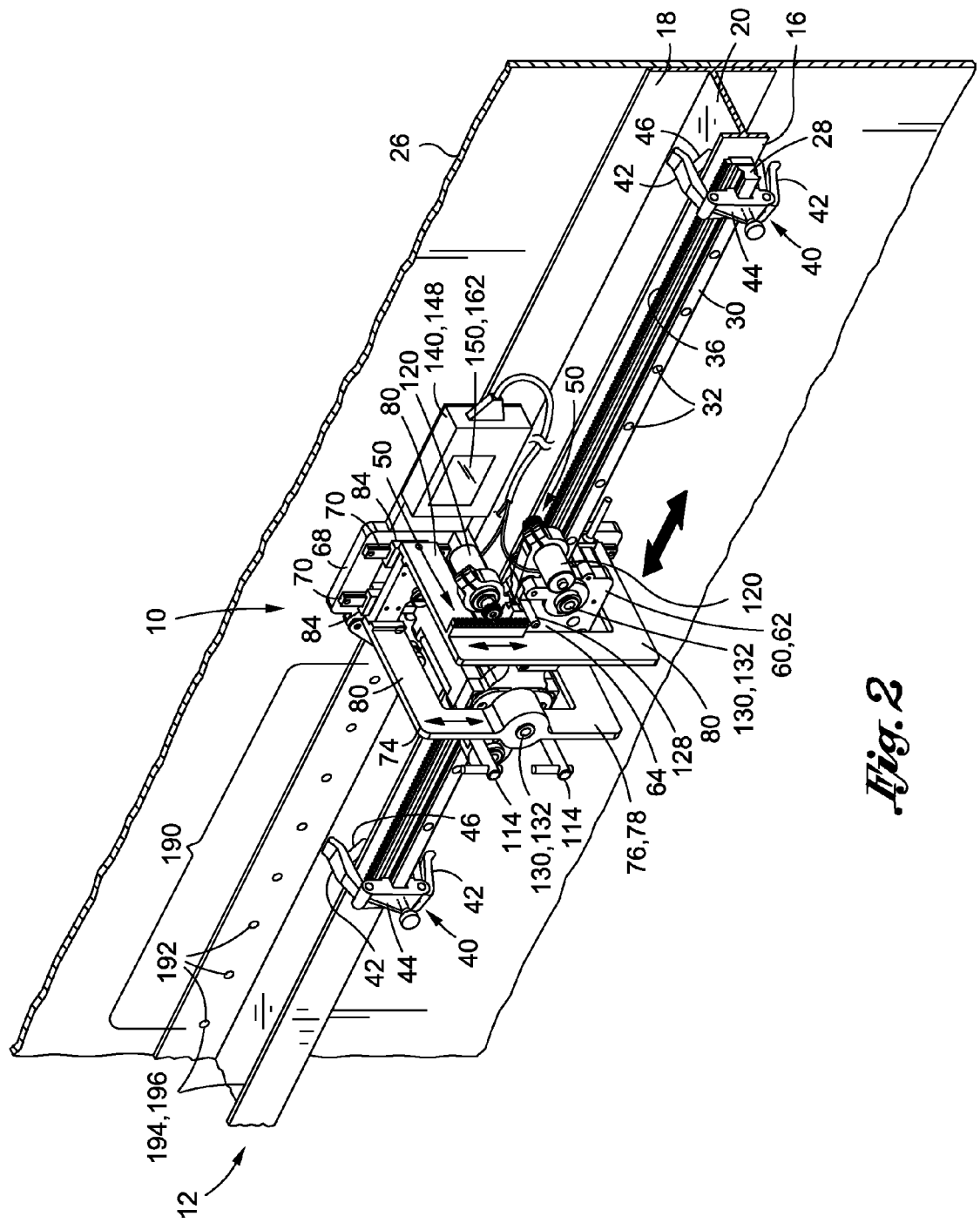
FIG. 2 is a perspective view of the crawler assembly illustrating an attachment mechanism which is removably attachable to the stringer.
Figure 3:
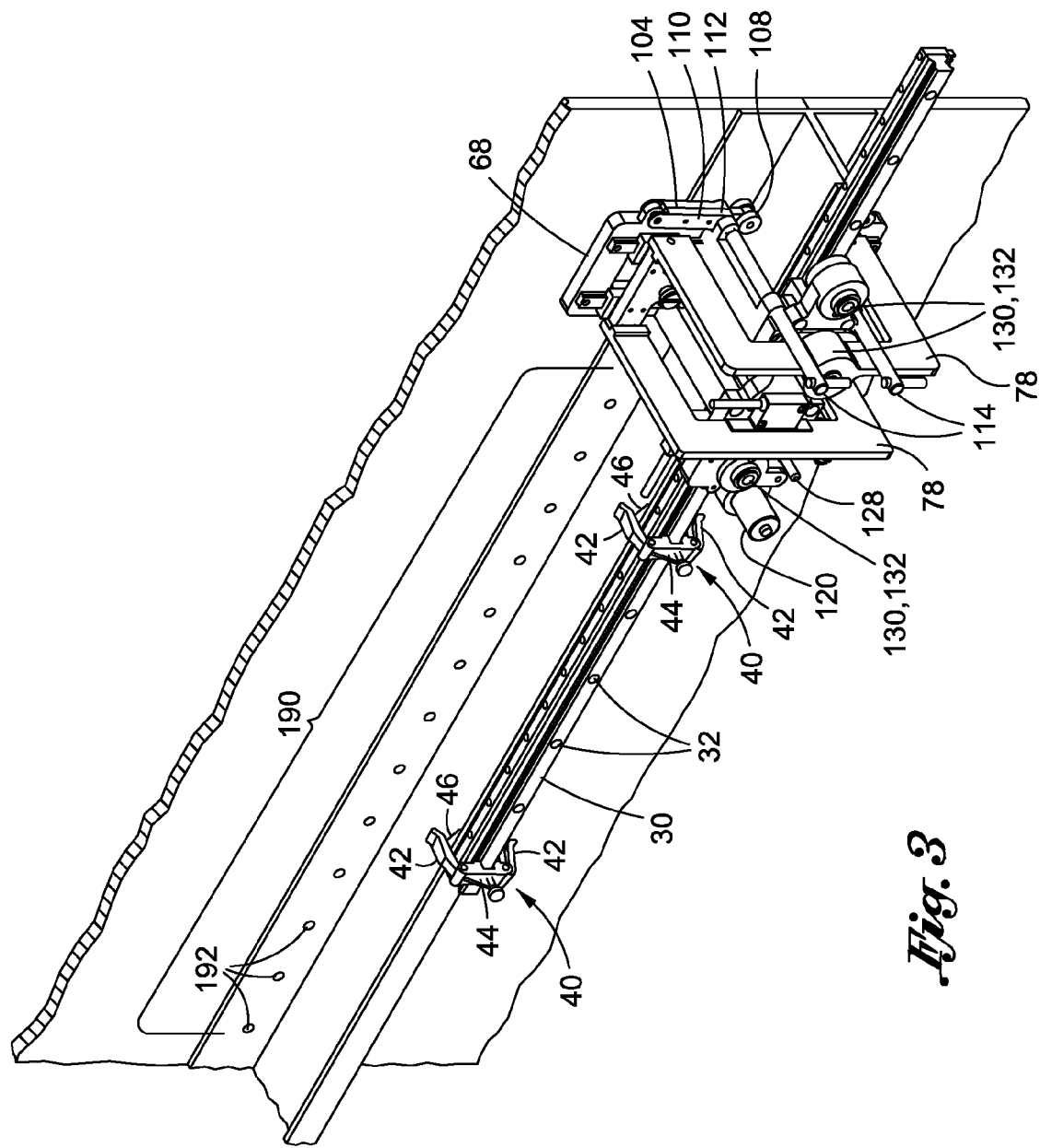
FIG. 3 is a perspective view of the crawler assembly wherein the attachment mechanism is repositioned relative to that which is shown in FIG. 2.

Referring to FIGS. 2 and 3, shown is the elongate attachment mechanism 28 clamped to the stringer 12 via the clamping devices 40 which are shown mounted on opposing ends of the attachment mechanism 28. When mounted to the stringer 12 via the attachment mechanism 28, the crawler assembly 10 as shown in FIG. 2 may facilitate drilling of the holes through the lower flange 18 of the stringer 12 and into the panel 26. Alternatively, the crawler assembly 10 may be configured to facilitate the drilling of holes through the vertical web 20 via an appropriate mounting configuration of the drill bushing 102.

Referring to FIG. 3, shown is the crawler assembly 10 wherein the attachment mechanism 28 has been repositioned toward the right along the stringer 12 in order to facilitate the drilling of an additional number of holes of a predetermined hole pattern 190. To allow drilling of a remaining number of holes in the series of the predetermined hole pattern 190, one of the clamping devices 40 in FIG. 3 has been relocated to an opposite side of the crawler assembly 10 compared to the position of the clamping device 40 in FIG. 2 such that in FIG. 3, both clamping devices 40 are installed on the same side of the attachment mechanism 28.

In the arrangement shown in FIG. 3, the crawler assembly 10 may move in an essentially unrestricted manner toward the end of the stringer 12 to allow for completion of the drilling of the holes through the stringer 12 and panel 26. The holes may be drilled through the panel 26 and/or stringer 12 in any pattern and are not limited to the linear series of holes shown in FIGS. 2 and 3. Furthermore, the crawler assembly 10 is not limited to installation of holes on both sides of the stringer 12 but may be configured to facilitate the drilling of holes in the panel 26 alone or in the stringer 12 alone.

As was earlier mentioned, the crawler assembly 10 may be adapted to index from a reference feature 194 such as an index hole 196 that may be pre-drilled in an upstream process. Alternatively, the crawler assembly 10 may be adapted to index from a reference feature 194 such as a surface feature (e.g., part edge or part surface) of the stringer 12 and/or of the panel 26.

Referring to FIG. 9, shown are the longitudinal and lateral sliders 60, 74 which cooperate to move the drill bushing 102 of the crawler assembly 10 to any one of a plurality of predetermined hole locations 192. As can be seen in FIG. 9, each one of the longitudinal and lateral sliders 60, 74 may comprise a frame 62, 76 which, in one embodiment, may include a horizontal leg 64, 78 and a pair of vertical legs 66, 80 extending from respective ones of the horizontal legs 64, 78. As shown in the figures, the horizontal leg 64 of the longitudinal slider 60 may extend along the stringer 12 when the crawler assembly 10 is mounted thereto. The vertical legs 66 may extend downwardly on one or both sides of the vertical web 20 toward the lower flange 18 of the stringer 12 wherein the vertical legs 66 on each side of the stringer 12 may be interconnected by a base 68. The longitudinal slider 60 may be engaged to the attachment mechanism 28 along the horizontal leg 64 of the frame 62. The normalizing mechanism 106 may be connected to the base 68 of the longitudinal slider 60 on one or both sides thereof.

The frame 76 of the lateral slider 74 may comprise a pair of U-shaped members which may each comprise a horizontal leg 78 and a pair of vertical legs 80 extending downwardly therefrom and being interconnected by a base 82 of the lateral slider 74. Each one of the bases 82 of the lateral slider 74 may include one or more guide slots 84 for engaging a complementary set of lower sliders 70 formed on the base 68 of the longitudinal slider 60. Sliding cooperation between the guide slots 84 and the lower sliders 70 stabilizes the lateral slider 74 during movement relative to the longitudinal slider 60.

It should be noted that the specific configuration of the lower sliders 70 and guide slots 84 of the lateral and longitudinal sliders 74, 60 at the bases 82, 68 is exemplary only and should not be construed as limiting alternative configurations for facilitating interconnection of the lateral and longitudinal sliders 74, 60 at the bases 82, 68. For example, instead of the guide slots 84 being formed in the lateral slider 74, the guide slots 84 may be formed in the longitudinal slider 60 with the lower sliders 70 being formed on the base 82 of the lateral slider 74. Additional configurations are contemplated for interconnecting the lateral and longitudinal sliders 74, 60 at the bases 82, 68 such that the illustrated configurations are not to be construed as limiting alternative embodiments.

Referring to FIG. 11, the drill bushing 102 may be mounted to each one of the bases 82 of the lateral slider 74. Although each drill bushing 102 is shown mounted on the respective bases 82 of the lateral slider 74, any number of drill bushings may be provided and in any orientation and configuration. Furthermore, although the lateral slider 74 is configured to move in a direction that is perpendicular to a plane defined by the vertical web 20 of the stringer 12, it is further contemplated that the lateral slider 74 may be configured to move in a direction that is parallel to a plane defined by the vertical web 20 or in any other direction. Such orientation may facilitate the drilling of holes in the vertical web 20 as opposed to the configuration illustrated in the figures which facilitates drilling of holes in the lower flange 18 and/or panel 26.

For configurations wherein the drill bushings 102 are oriented to drill holes in the vertical web 20 of the stringer 12, the above-described lower sliders 70 and guide slots 84 which interconnect the lateral slider 74 to the longitudinal slider 60 may be replaced by an alternative interconnection mechanism facilitating relative sliding movement of the longitudinal and lateral sliders 60, 74 along a plane parallel to the vertical web 20. It is further contemplated that the crawler assembly 10 may be configured to facilitate movement of the lateral slider 74 in a combination of directions such as along a direction that is both perpendicular and parallel to the plane of the vertical web 20 of the stringer 12.

Each one of the longitudinal and lateral sliders 60, 74 may include at least one drive mechanism 120 such as an electrically powered motor or other suitable drive mechanism. The drive mechanisms 120 are preferably powered by a suitable power source 146 such as a battery which may be integrated into the crawler assembly 10 such that the crawler assembly 10 is provided as a self-contained unit. Although provided in any suitable A.C. or D.C. arrangement, in a preferable embodiment, the power source 146 may be configured as a lithium polymer battery having recharging capability and which is preferably of a low voltage and high amperage output.

The crawler assembly 10 may further comprise an appropriate drive train 50 to operatively couple each one of the drive mechanisms 120 to respective ones of the longitudinal and lateral sliders 60, 74. For example, as best seen in FIG. 11, the drive train 50 may comprise a rack 34 and pinion 122. The drive mechanism 120 for the longitudinal slider 60 may include a pinion 122 gear having circumferentially arranged gear teeth 36 configured to mesh with a rack 34 (i.e., gear teeth 36) formed linearly along a length of the rail 30 of the attachment mechanism 28.

Likewise, the drive mechanism 120 for the lateral slider 74 may include a pinion 122 gear configured to mesh with a short length of rack 34 fixably mounted to the frame 76 of the lateral slider 74 as best seen in FIG. 11. The rack 34 and pinion 122 of drive train 50 of the longitudinal slider 60 which couples the drive mechanism 120 (i.e., motor) to the attachment mechanism 28 facilitates movement of the crawler assembly 10 along a direction that is parallel to the longitudinal axis 14. Likewise, the drive mechanism 120 (i.e., motor) of the lateral slider 74 facilitates movement of the lateral slider 74 in a direction that is perpendicular to the longitudinal axis 14.

In a preferable embodiment, the pinions of each of the drive mechanisms 120 (i.e., motors) of the longitudinal and lateral sliders 60, 74 are configured to be disengagable from the respective racks thereof. As best seen in FIG. 11, the disengagement feature may comprise a motor bracket 124 which may be pivotally mounted to the frame 62 of the longitudinal slider 60 by means of a pivot pin 126. In this regard, each of the motor brackets 124 for the drive mechanisms 120 of the lateral and longitudinal sliders 74, 60 may be pivotable about the pivot pin 126 in order to allow pivoting of the drive mechanism 120 away from the rack 34.

A common pivot arm 128 may be provided for the motor brackets 124 to allow for simultaneous manual disengagement of the drive mechanisms 120 (i.e., motors) of the lateral and longitudinal sliders 74, 60. At least one and, more preferably, both of the drive mechanisms 120 may include a biasing mechanism to bias each of the drive mechanisms 120 toward engagement with the respective racks of the longitudinal and lateral sliders 60, 74. In this manner, the pinion 122 gears of each motor may be disengaged from the racks 34 of the attachment mechanism 28 and lateral slider 74 by manually pulling on the pivot arm 128 such that the drill bushing 102 may be manually positioned at any location.

In a further embodiment, the crawler assembly 10 may comprise at least one brake mechanism 130 which is configured to apply a braking force against movement of the crawler assembly 10. More specifically, the longitudinal slider 60 may include at least one brake mechanism 130 configured to apply a braking force against the attachment mechanism 28 for stopping the drill bushing 102 at a predetermined hole location 192 along the stringer 12. Likewise, a brake mechanism 130 may apply a braking force against movement of the longitudinal slider 60 to stop the lateral slider 74 at the predetermined hole locations 192. The brake mechanism 130 for the longitudinal slider 60 is configured to stop movement of the crawler assembly 10 along the stringer 12. Conversely, the brake mechanism 130 for the lateral slider 74 is configured to stop movement of the crawler assembly 10 in a direction that is perpendicular to the stringer 12.

The brake mechanisms 130 for the longitudinal and lateral sliders 74, 60 cooperate with the drive mechanisms 120 to move the drill bushings 102 to the predetermined hole locations 192 whereupon the machining operation (i.e., drilling) may be performed prior to moving on to a subsequent predetermined hole location 192 of the hole pattern 190. The brake mechanisms 130 may be provided in any suitable embodiment and, preferably, comprise an electromagnet 132 configured to magnetically engage a metallic component of the crawler assembly 10.

As shown in FIGS. 1-4, the brake mechanisms 130 for the longitudinal slider 60 may comprise a pair of electromagnets 132 mounted on opposing ends of the horizontal leg 64 of the frame 62. Each of the electromagnets 132 is configured to magnetically engage the attachment mechanism 28 which, in a preferable embodiment, is formed of metallic material. Likewise, an electromagnet 132 may be integrally formed with at least one of the horizontal legs 78 of the frame 76 of the lateral slider 74 and may be configured to magnetically engage a metallic component such as the frame 62 of the longitudinal slider 60. However, a simple spring-loaded brake may be implemented.

The crawler assembly 10 may further comprise at least one and, more preferably, a pair of position feedback mechanisms 134 for providing feedback regarding the position of the drill bushing 102 relative to the reference feature 194. More specifically, the position feedback mechanisms 134 are preferably communicatively coupled to a controller 148 as best seen in FIGS. 1 and 2 and which is operative to regulate movement of the longitudinal and lateral sliders 60, 74. The controller 148 preferably includes a suitable processor assembly 168 and may include an operator interface 150 communicatively coupled to the drive mechanisms 120 and to the brake mechanisms 130. The controller 148 is specifically configured to regulate operation of the drive and brake mechanisms 120, 130 in order to move the drill bushing 102 to a predetermined hole location 192.

Position feedback mechanisms 134 such as rotary or linear encoders 136 may be communicatively coupled to the controllers 148 to provide position feedback to the microprocessor for controlling operation of the drive mechanisms 120 (i.e., motors). The controller 148 and associated electronics as well as the drive mechanisms 120 and the brake mechanisms 130 are preferably powered by the power source 146 which, as was earlier described, preferably comprises a suitable low-voltage D.C. power source 146 such as a battery. The controller 148 may be preprogrammed with a numerically controlled hole pattern 190 for driving the crawler assembly 10 via operation of the drive mechanism 120 and brake mechanisms 130.

Alternatively, the operator interface 150 may be adapted to permit real-time control of the crawler assembly 10 via the controller 148 in order to move the crawler assembly 10 to a desired hole location(s). As was indicated above, movement of the controller 148 may be keyed or indexed from a reference feature 194 such as a pre-drilled index hole 196 in the panel 26 and/or stringer 12. However, the reference feature 194 may comprise a part feature of the upper flange 16, lower flange 18, vertical web 20 or other features.

In a further embodiment, the reference feature 194 may be provided via a through-the-skin alignment mechanism which may comprise a magnet 198 configured for insertion into the drill bushing 102. As best seen in FIG. 5, a magnetic pickup 200 or magnetic sensor may be held by a technician and may be visually aligned with a desired hole location on a backside of the panel 26. The crawler assembly 10 on an opposite side of the panel may be manually moved to the magnetic pickup 200 until the magnet 198 in the drill bushing 102 is magnetically aligned with the magnetic pickup 200 on the backside of the panel 26.

Regardless of the manner in which the reference feature 194 is located or indexed, once indexed, the drive mechanisms 120 may then be re-engaged by releasing the pivot arm 128 such that the pinion 122 gears of the motors re-engage the respective racks 34 of the longitudinal and lateral sliders 60, 74. The crawler assembly 10 may then be activated to cause the drive mechanisms 120 and brake mechanisms 130 to move the drill bushing 102 to a new hole location.

The controller 148 is preferably programmable with at least one hole pattern 190 each comprising one or more predetermined hole locations 192. The controller 148 is operative to cause the drive and brake mechanisms 120, 130 to cooperate in moving the drill bushing 102 toward at least one of the predetermined hole locations 192 in the hole pattern 190 and stopping the drill bushing 102 thereat. Upon arrival at the predetermined hole location, the desired machining operation such as manual drilling may be performed using a drill motor. As was earlier mentioned, the controller 148 is pre-programmable with a hole pattern 190 or may be manually programmed with a hole pattern 190. In addition, the controller 148 may allow for manual entry of predetermined hole location 192 coordinates in real-time.

Referring now to FIGS. 12A-22, in an alternative embodiment, shown is a crawler assembly 10 utilizing friction drive for movement along the stringer 12. In this regard, the embodiment illustrated in FIGS. 12A-22 omits the attachment mechanism 28 and instead directly mounts to the stringer 12 and is frictionally engageable thereto. The crawler assembly 10 illustrated in FIGS. 12A-22 may further include the drill bushing 102 as described above for performing machining operations such as drilling fastener holes.

As best seen in FIG. 17, the crawler assembly 10 is directly engageable to the stringer 12 and is frictionally driven therealong by at least one and, more preferably, a pair of drive rollers 178 which are disposable in rolling contact against the outer surface 24 of the upper flange 16 of the stringer 12. Furthermore, the crawler assembly 10 may include a pair of clamping devices 40 preferably disposable on opposing ends of the crawler assembly 10. Each one of the clamping devices 40 preferably includes at least one stringer roller 108 disposable in rolling contact against the inner surface 22 of the upper flange 16 of the stringer 12. The stringer roller 108 and the drive roller 178 cooperate to clamp the upper flange 16 therebetween. The drive roller 178 is coupled to a drive mechanism 120 such as an electric motor for driving the crawler assembly 10 along the length of the stringer 12.

Figure 12A:
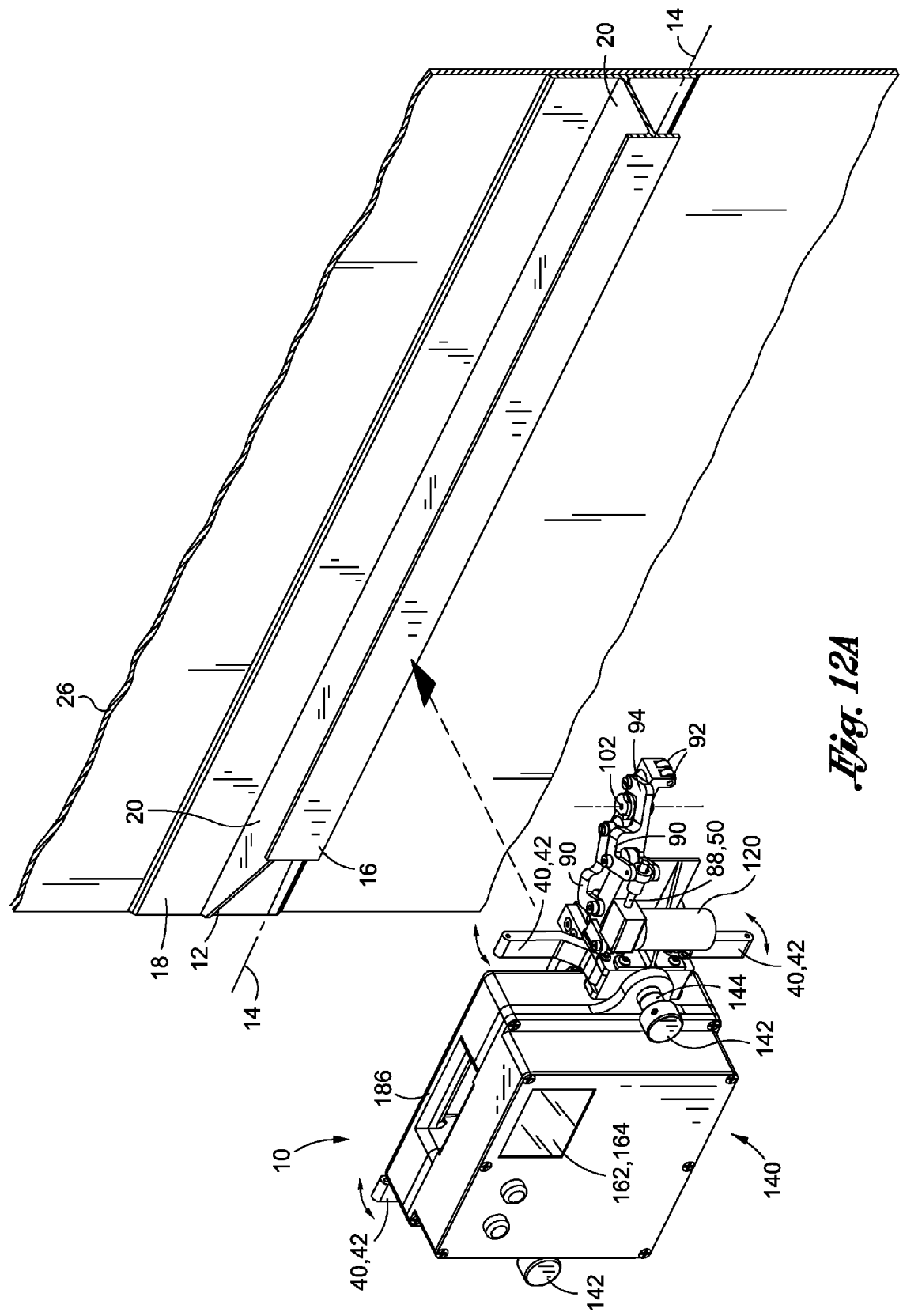
FIG. 12A is a perspective illustration of the crawler assembly in an alternative embodiment disposed in spaced relation to a stringer.
Figure 12B:
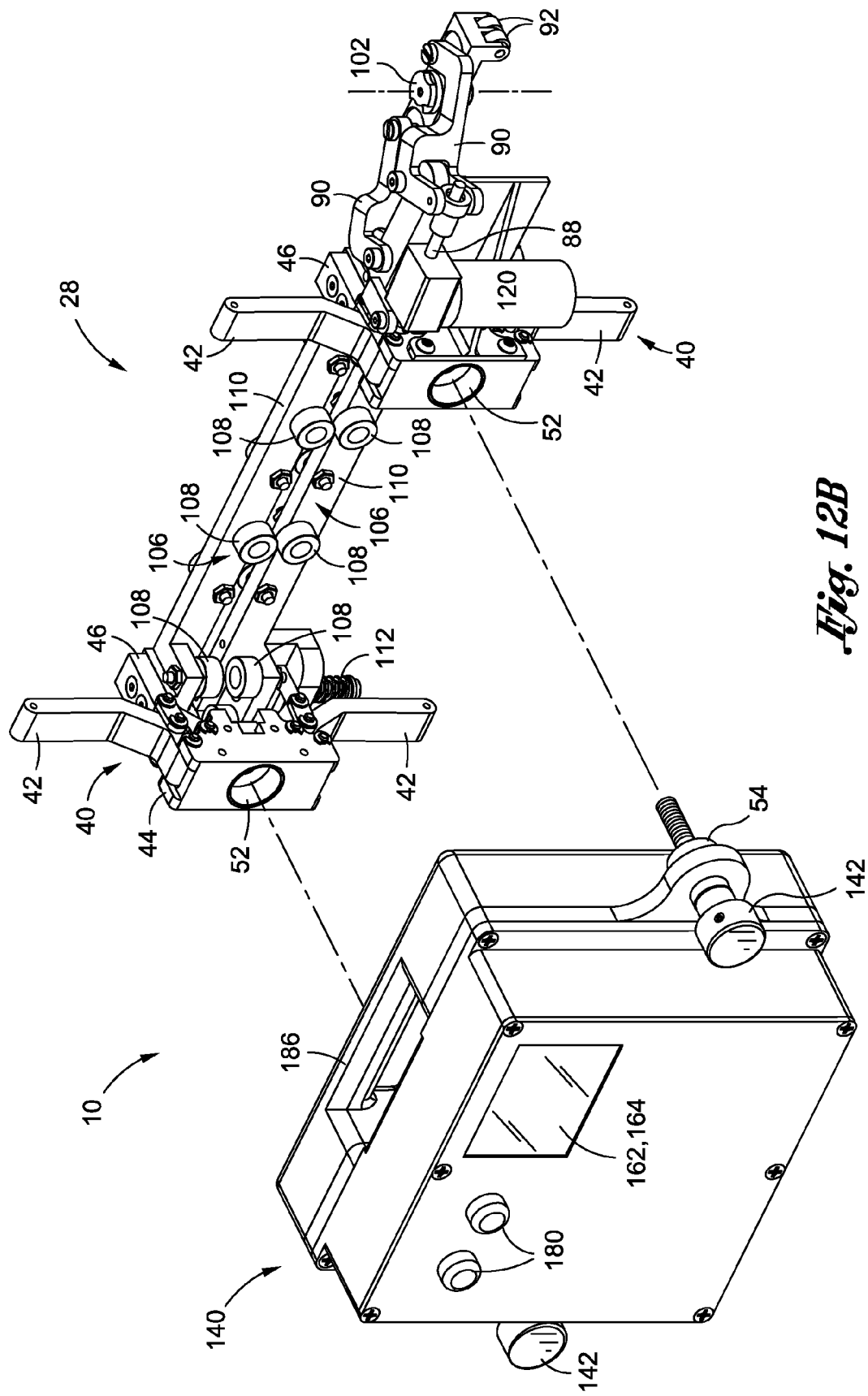
FIG. 12B is a perspective illustration of an electronic module of the crawler assembly in an alternative embodiment disposed in spaced relation to a longitudinal and lateral slider of the crawler assembly.
Figure 13:
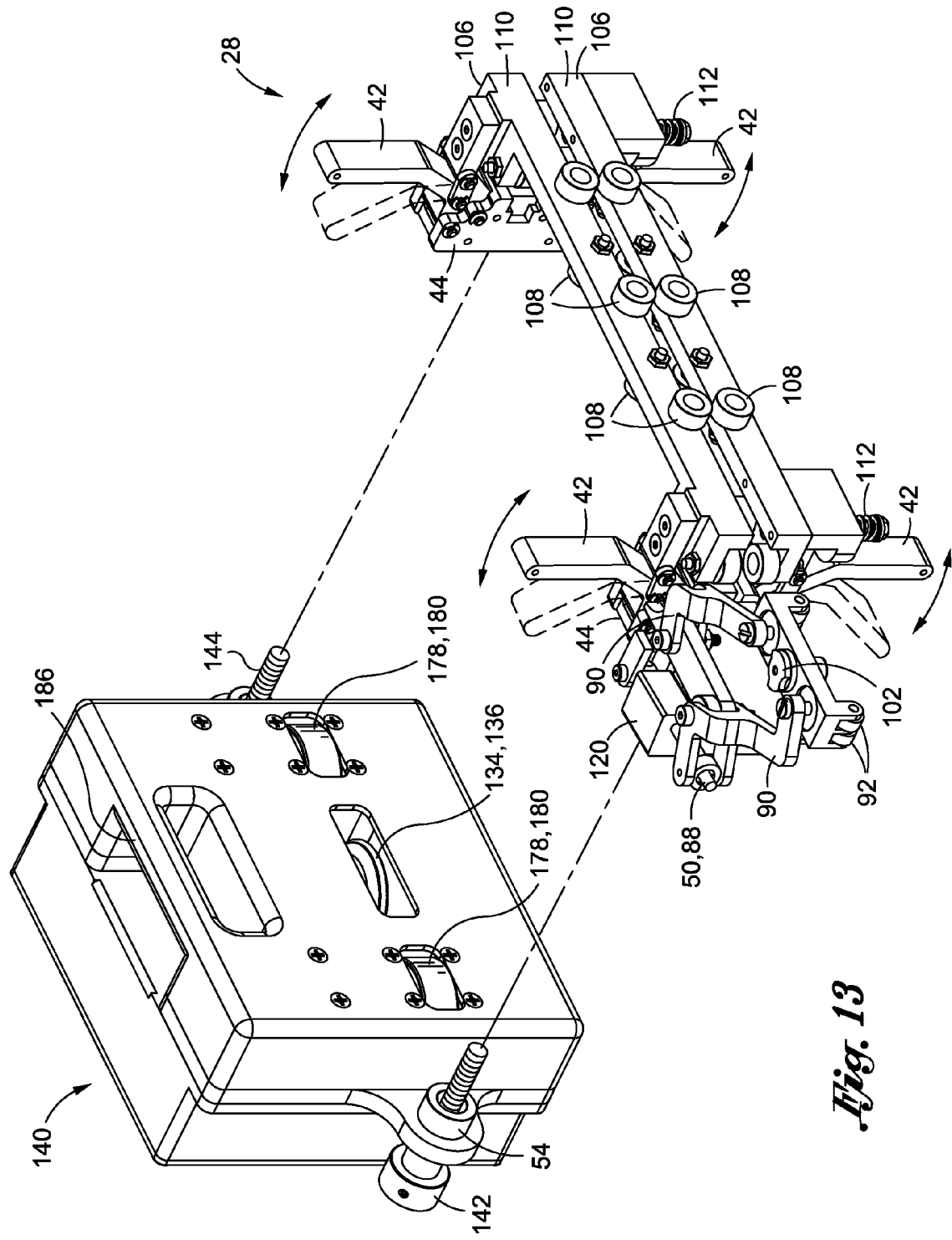
FIG. 13 is a perspective illustration of the electronic module disposed in spaced relation to the longitudinal and lateral sliders.

As illustrated in FIGS. 12B and 13, each of the clamping devices 40 may be comprised of a pair of pivotally mounted clamp levers 42 mounted to clamp bodies 44. The clamp levers 42 are coupled to a corresponding pair of clamp arms 46 sized and configured to engage an underside of the upper flange 16 of the stringer 12. In a configuration similar to that described above with reference to the clamping devices 40 of FIGS. 1-11, the clamping devices 40 illustrated in FIGS. 12A-22 may be configured such that the clamp levers 42 are coupled to cam-shaped links that may be connected to the clamp arms 46 in order to allow the clamping devices 40 to lock into place whenever the clamp levers 42 are actuated.

As shown in FIGS. 12B, 13 and 17-20, the clamping devices 40 cooperate with the drive rollers 178 of the longitudinal friction drive 176 to engage the crawler assembly 10 to the upper flange 16 of the stringer 12. In one embodiment, the drive rollers 178 are preferably coated with a high-friction coating 180 such as a urethane coating on an outer circumference thereof in order to increase frictional engagement to the upper flange 16 of the stringer 12. The clamping devices 40 may include stringer rollers 108 in both vertical and horizontal orientations as best seen in FIG. 17 in order to engage both the inner surface 22 of the upper flange 16 and opposing sides of the vertical web 20 of the stringer 12. As shown in FIGS. 12B and 13, the stringer rollers 108 may be mounted on a roller bracket 110 which may extend between the opposing clamping devices 40 of the crawler assembly 10. However, it is contemplated that the stringer rollers 108 may be provided as individual components of separate clamping devices 40.

The stringer rollers 108 which bear against the opposing web surfaces may comprise the normalizing mechanism 106 for the crawler assembly 10 of FIGS. 12A-22. In this regard, the stringer rollers 108 may maintain vertical alignment of the crawler assembly 10 relative to the vertical web 20 of the stringer 12 or other feature of the stringer 12. The normalizing mechanism 106 for the crawler assembly 10 illustrated in FIGS. 12A-22 is functionally similar to that which was described with reference to the normalizing mechanism 106 for the crawler assembly 10 of FIGS. 1-11.

Figure 14A:
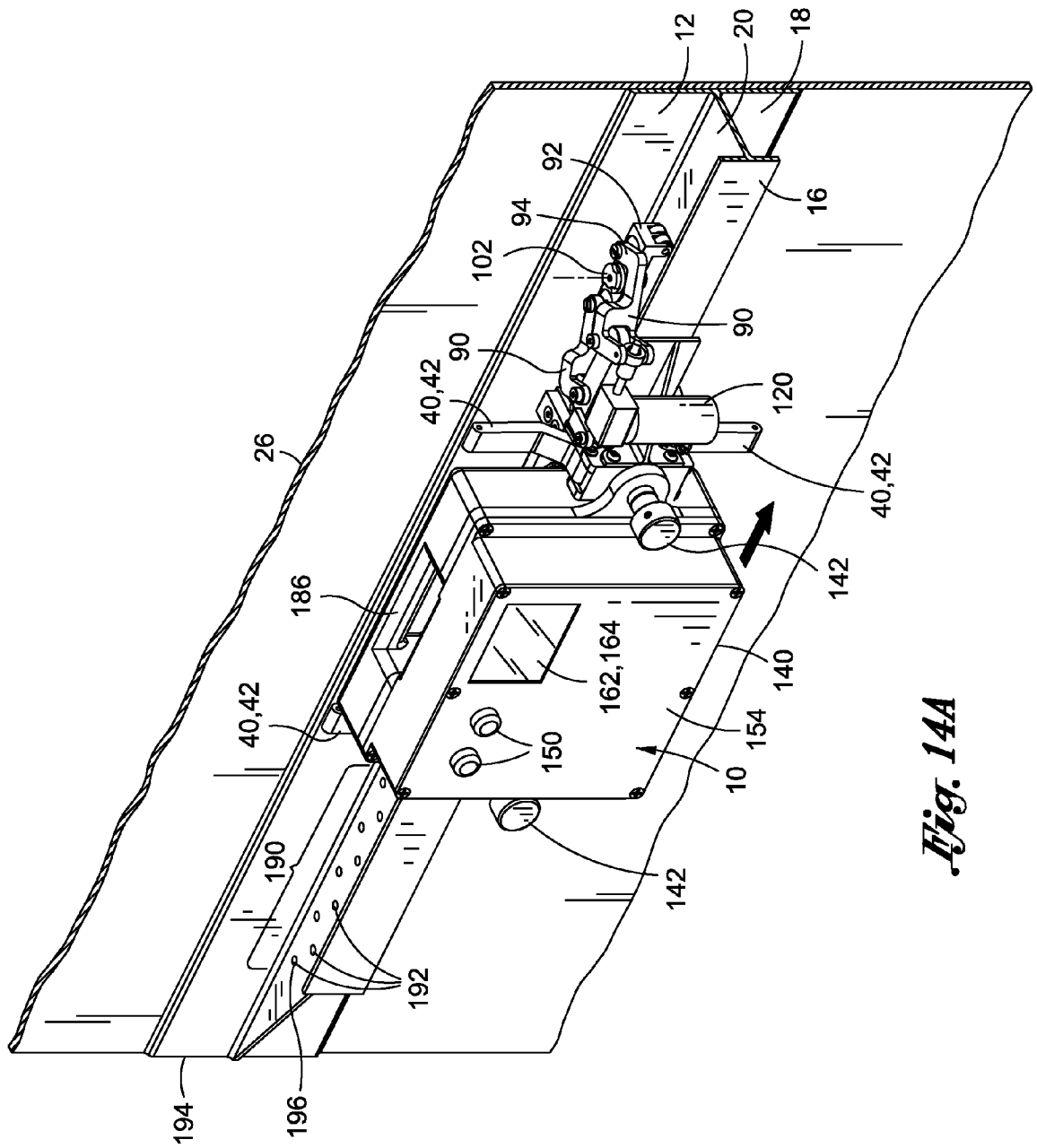
FIG. 14A is a perspective illustration of the crawler assembly engaged to the stringer.

Referring to FIGS. 13 and 16-19, the stringer rollers 108 are disposable in rolling contact against at least one of the opposing sides of the vertical web 20 and may include a biasing mechanism 112 such that the stringer rollers 108 may accommodate different thickness of the vertical web 20. The biasing mechanism 112 may comprise a compression spring mounted on a threaded stud extending between a floating bracket and the arm upon which the stringer rollers 108 are mounted. Such compression springs may provide a self-adjustment feature for accommodating variations in thickness of the vertical web 20 of the stringer 12 as the crawler assembly 10 moves therealong. The combination of the clamping devices 40 and the drive rollers 178 facilitates mounting of the crawler assembly 10 at any position along a length of the stringer 12. For example, FIGS. 14A and 16 illustrates the crawler assembly 10 being mounted on the stringer 12 and further illustrates a plurality of holes drilled in the vertical web 20 with the aid of the crawler assembly 10.

In a broad sense, the crawler assembly 10 of FIGS. 12A-22 is comprised of the longitudinal friction drive 176 and the lateral slider 74. The longitudinal friction drive 176 is operative to move the crawler assembly 10 in a direction that is parallel to the longitudinal axis 14 of the stringer 12. The lateral slider 74 is mountable on the longitudinal friction drive 176 and is movable in a direction that is perpendicular to the longitudinal axis 14. The lateral slider 74 may include at least one drill bushing 102 described above. The longitudinal friction drive 176 and the lateral slider 74 cooperate to move the drill bushing 102 to a desired or predetermined hole location 192 such as according to a CNC hole pattern 190 or via manually-inputted hole coordinates.

The lateral slider 74 is illustrated in the figures as being attached to or integral with the longitudinal friction drive 176 and is oriented in such a manner to allow drilling of holes in the vertical web 20 of the stringer 12. However, the illustrated configuration of the lateral slider 74 is exemplary in nature and should not be construed as limiting alterative arrangements of the lateral slider 74. In this regard, it is contemplated that the lateral slider 74 illustrated in FIGS. 12A-15 may be substituted with a configuration of the lateral slider 74 illustrated in FIGS. 1-11 as described above.

Figure 14B:
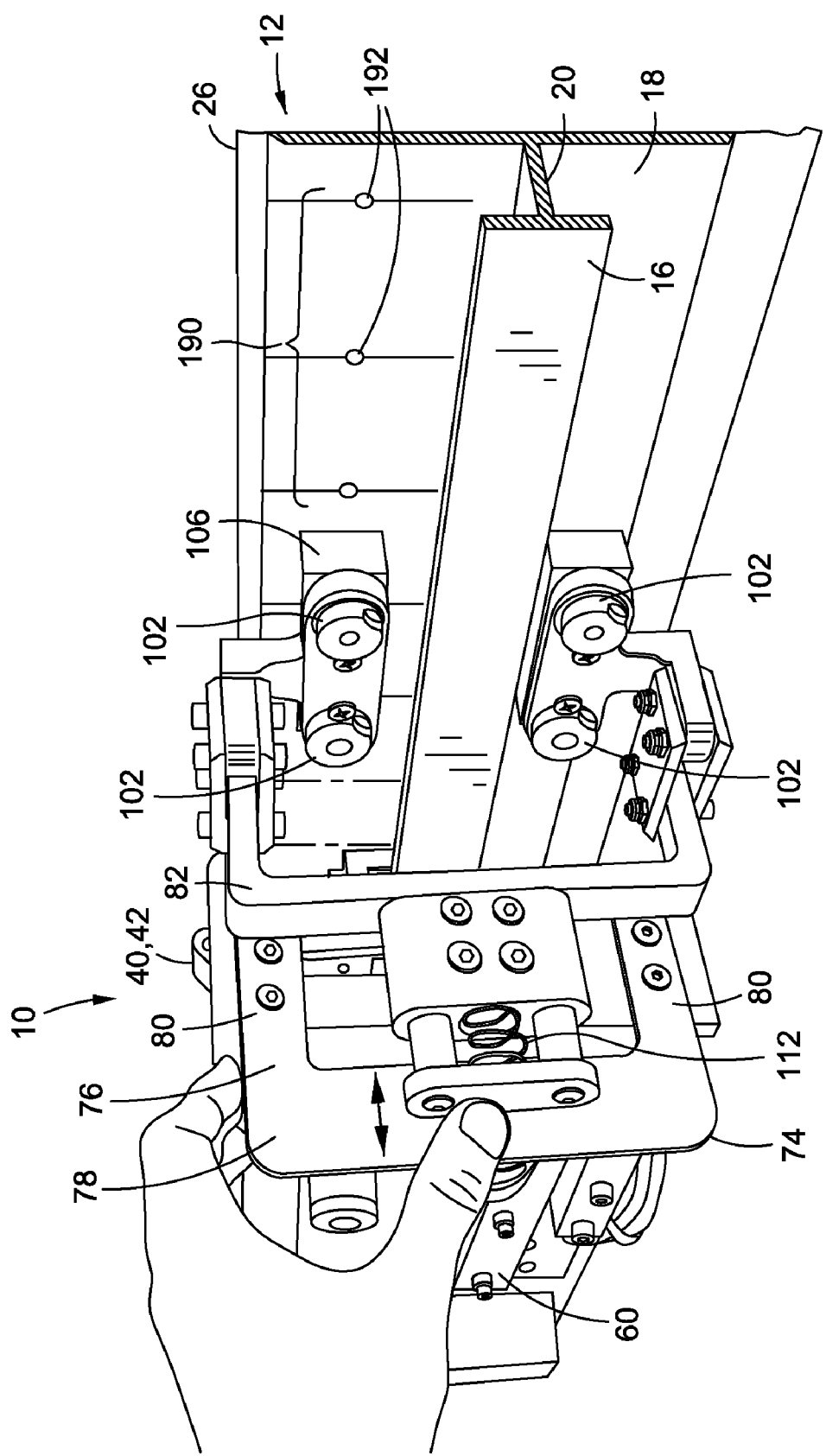
FIG. 14B is a perspective illustration of the lateral slider in an alternative embodiment.
Figure 18:
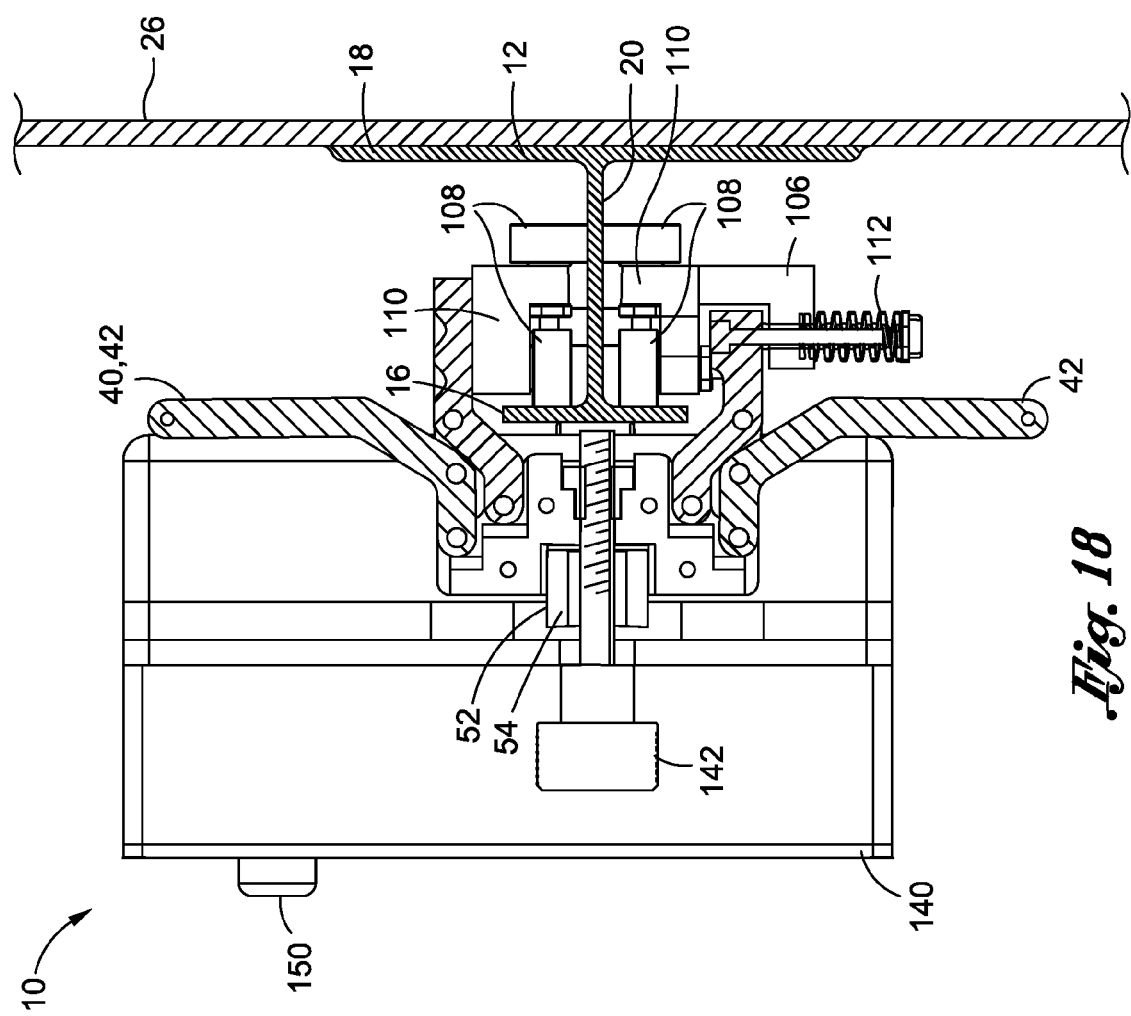
FIG. 18 is a sectional illustration taken along lines 18-18 of FIG. 16 and illustrating a clamping device engaged to the stringer.
Figure 19:
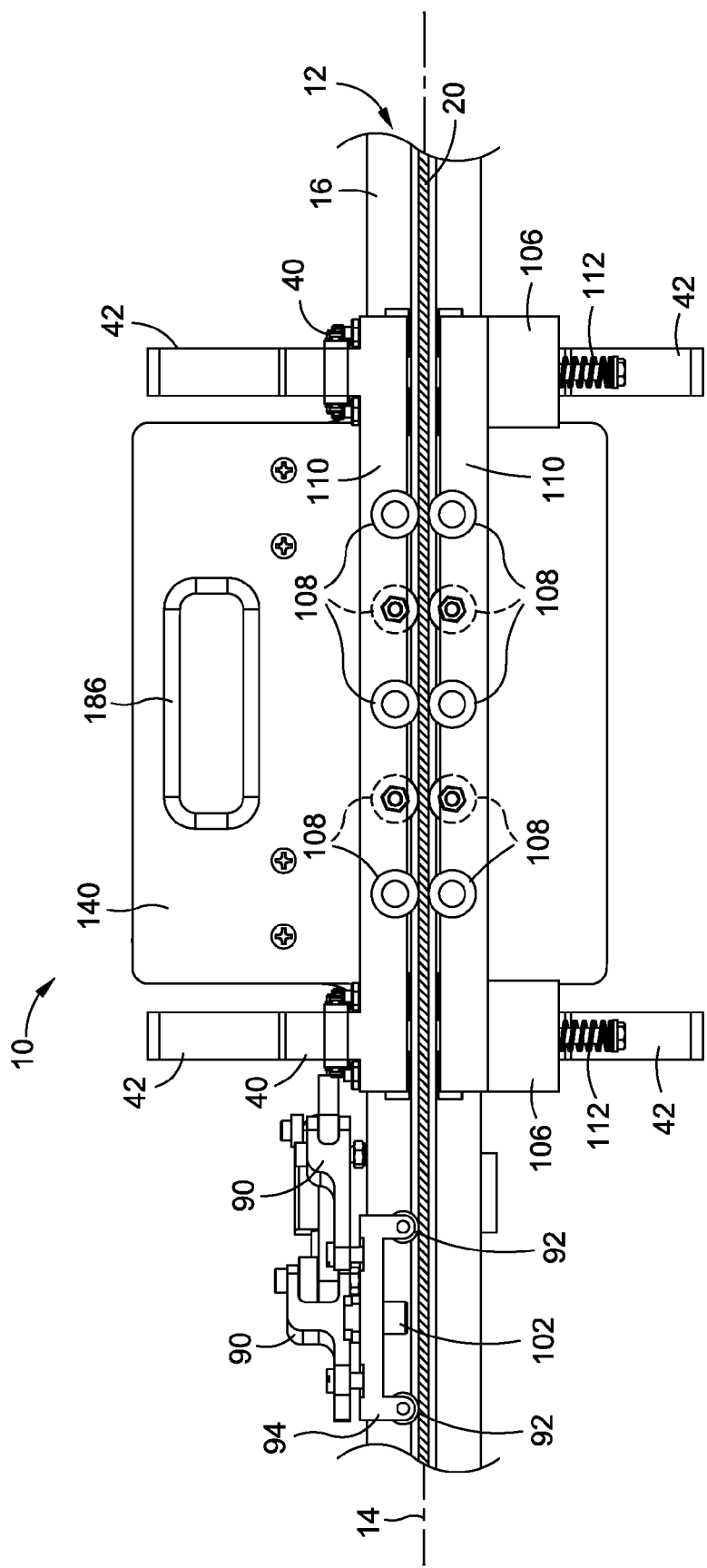
FIG. 19 is a side sectional illustration taken along lines 19-19 of FIG. 17 and illustrating a plurality of rollers on opposed sides of the vertical web.
Figure 20:
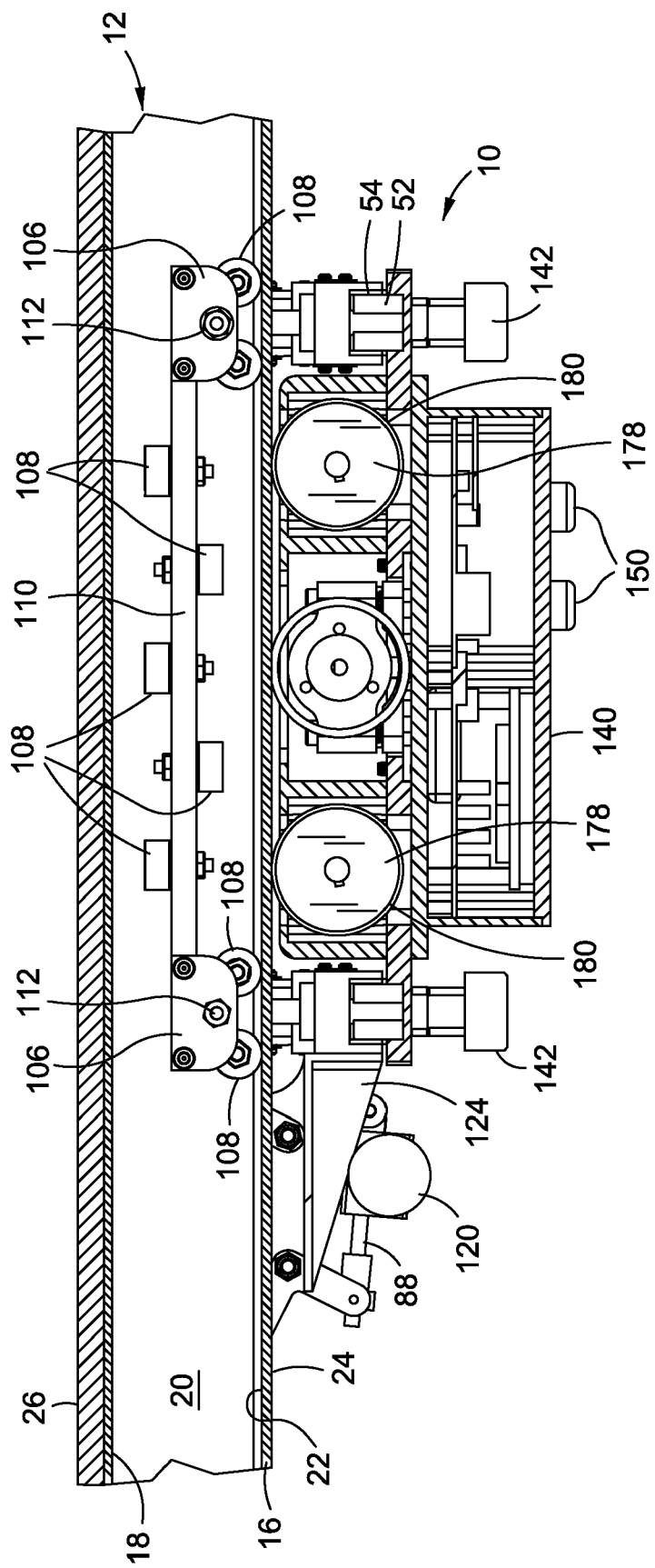
FIG. 20 is a side sectional illustration taken along lines 20-20 of FIG. 17 and illustrating a pair of drive rollers in opposing relation to the rollers of the clamping device.

For example, as shown in FIG. 14B, the lateral slider 74 may be configured to move in a direction that is perpendicular to a plane defined by the vertical web 20 of the stringer 12. One or more drill bushings 102 may be mounted to one or more bases 82. Each one of the bases 82 may be mounted to a corresponding one of the vertical legs 80 of the frame 76 of the lateral slider 74. The configuration of the lateral slider 74 as shown in FIG. 14B is exemplary only and may be provided in a variety of alternative shapes, sizes and configurations. Furthermore, the fixture(s) as mounted to the bases 82 may be provided in any number of different orientations to facilitate drilling of holes in any orientation through any portion of the stringer 12 and/or panel 26. Preferably, the biasing mechanism 112 may be included in the lateral slider 74 to facilitate upward biasing of the base 82 away from the panel 26 and stringer 12. In this manner, the lateral slider 74 may be positioned at any location along the stringer 12 without contact between the base 82 and the stringer 12 during such movement.

Referring to FIGS. 12A-14A and 16, the lateral slider 74, in one embodiment, can be seen as comprising a pair of links 90 in a four-bar-linkage arrangement. The links 90 may be operatively coupled to the drive mechanism 120 (i.e., motor). A fixture mounting bracket 94 may be mounted to the links 90. The drill bushing 102 may be mounted to the fixture mounting bracket 94. The fixture mounting bracket 94 may be supported at opposing ends by at least one and, more preferably, a pair of idler rollers 92 to facilitate rolling movement of the lateral slider 74 along the vertical web 20. The idler rollers 92 may provide a normalizing feature to orient the drill bushing 102 in a perpendicular orientation relative to the vertical web 20 through which the holes may be drilled.

One of the links 90 of the lateral slider 74 may be coupled to the drive mechanism 120 (i.e., motor) by means of a threaded nut coupled to a rotatable threaded shaft 88 extending outwardly from the drive mechanism. Rotation of the threaded shaft 88 causes axial movement relative to the threaded shaft 88 and changes the position of the fixture mounting bracket 94 upon which at least one drill bushing 102 is mounted. Although the links 90 are coupled to the drive mechanism 120 by a means of the threaded nut/threaded shaft arrangement, alternative coupling means may be implemented such as rack 34 and pinion 122 drive train 50 arrangement described above.

In an embodiment not shown, the lateral slider 74 may be disengagable from the drive mechanism 120 as described above in order to facilitate manual movement to a different location. In this regard, a biasing mechanism 112 may be integrated into the coupling between the drive mechanism 120 (i.e., motor) and the lateral slider 74. In an alternative embodiment not shown, the lateral slider 74 of FIGS. 12-22 may be configured similar to that which is illustrated in FIGS. 1-11 wherein the lateral slider 74 includes a frame 76 having a horizontal leg 78 and a pair of vertical legs 80 extending downwardly therefrom on opposite sides of the stringer 12 with drill bushings 102 being mounted to the bases 82.

The brake mechanism 130 may be included with the lateral slider 74 to stop movement of the lateral slider 74 upon arrival of the predetermined hole location. The lateral slider 74 may include a position feedback mechanism 134 which may be communicatively coupled to the controller 148 and which may be operative to indicate the position of the drill bushing 102 along a direction perpendicular to the longitudinal axis 14 of the stringer 12. In a preferable embodiment, the position feedback mechanism 134 is configured as a linear encoder 136 and may be mounted on the lateral slider 74 to provide signals indicative of the position thereof.

Figure 21:
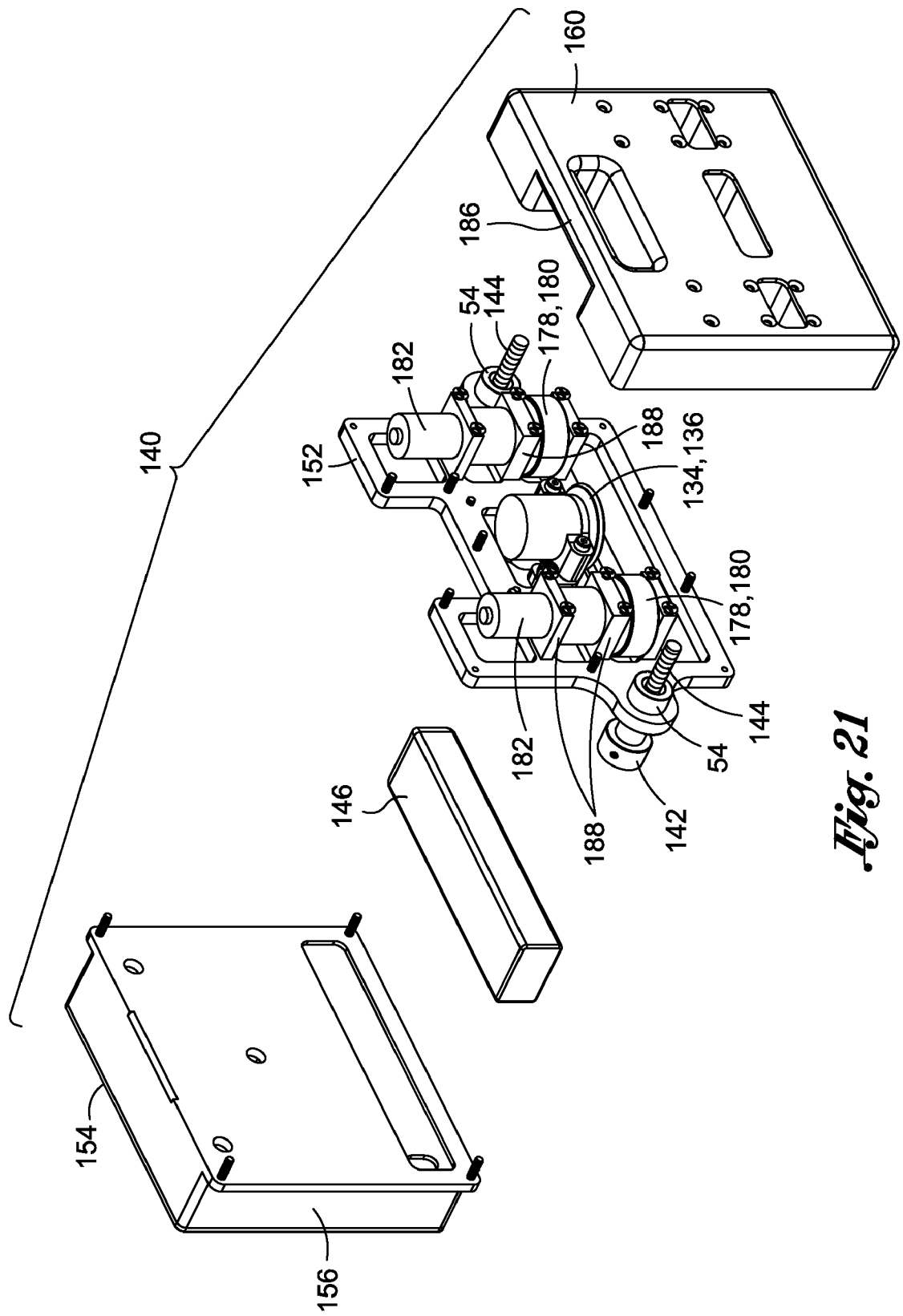
FIG. 21 is an exploded illustration of the electronics module.

Likewise, and referring to FIGS. 13 and 21, the crawler assembly 10 may further comprise a position feedback mechanism 134 which may be communicatively coupled to the controller 148 for indicating the position of the crawler assembly 10 along the longitudinal axis 14. In one embodiment, the position feedback mechanism 134 may be integrated into the longitudinal friction drive 176 and may be configured as a rotary encoder 136 or wheel which is mounted on the longitudinal friction drive 176 and which is operative to indicate the position thereof relative to the stringer 12 along the longitudinal axis 14. The rotary encoder 136 preferably operates independent of the drive rollers 178 to facilitate accuracy in positioning the drill bushing 102.

The longitudinal friction drive 176 may further include at least one brake mechanism 130 (not shown) configured to apply a braking force against the stringer 12 for stopping movement of the crawler assembly 10 along the stringer 12. The brake mechanism 130 for the longitudinal friction drive 176 may comprise an electromagnet 132 for magnetically engaging the stringer 12. However, in a preferable embodiment, the brake mechanism 130 is omitted from the longitudinal friction drive 176 as such braking force is inherently provided by operation of the drive mechanism 120 (i.e., motor) which is directly coupled to the drive roller 178. In this regard, the drive mechanism 120 acts as both a driving force and a braking force for the longitudinal friction drive 176.

As best seen in FIGS. 12A-15 and 21-22, the controller 148, drive mechanisms 120, position feedback mechanisms 134 (i.e., encoder) and power source 146, among other components, may be integrated into an electronics module 140. The drive rollers 178 are preferably mounted in the electronics module 140 such that a portion of each of the drive rollers 178 protrudes out of wheel openings formed in an inner module frame 152 of the electronics module 140. Each of the drive rollers 178 may be fixedly mounted to an inner module frame 152 of the electronics module 140 and may be supported by a pair of bearing blocks 188 as best seen in FIG. 21.

Figure 22:
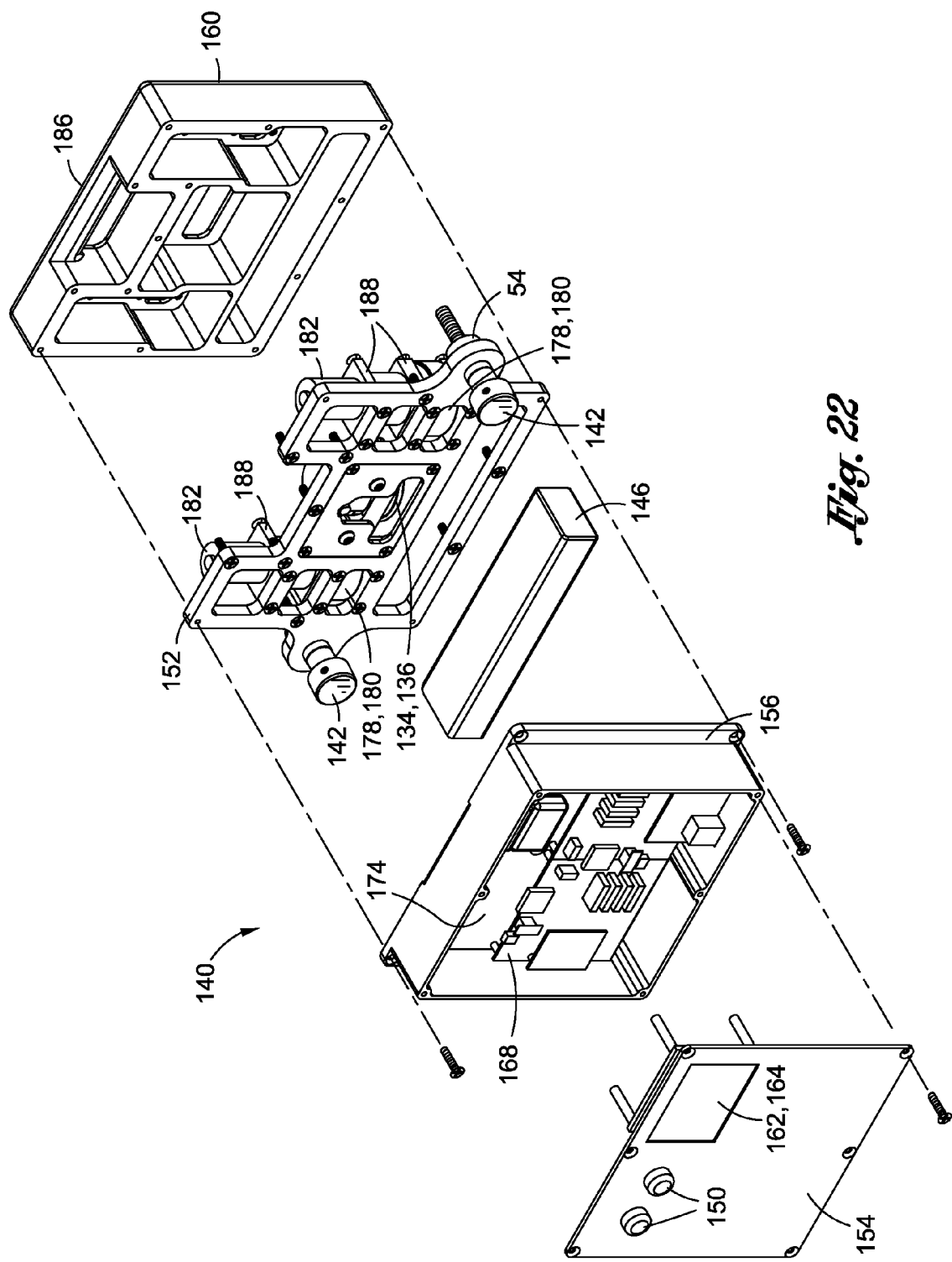
FIG. 22 is an exploded illustration of the electronics module viewed from an upper side thereof.

Each of the drive rollers 178 may be operatively coupled to a drive mechanism 120 (i.e., electric motor) by means of a gear box such as a planetary gear motor 182 having a desired gearing ratio. The drive wheels and planetary gear motor 182 may extend through the bearing blocks 188 for supporting the drive rollers 178 that may be mounted on a shaft extending outwardly from the planetary gear motor. The inner module frame 152 and components mounted thereto may be sandwiched between a lower frame 160 and an electronics module cover 156 as best seen in FIGS. 21 and 22. The power source 146 may be configured as the above-described battery which may be integrated into the electronics module 140 via a battery opening. The controller 148 may be integrated into the electronics module 140 and may include the necessary processors and speed controllers 174 for regulating operation of the crawler assembly 10. In addition, the electronics module 140 may include hardware for facilitating internet and other connectivity for remote monitoring and/or programming of the crawler assembly 10.

As was earlier mentioned, the controller 148 is preferably adapted to facilitate programming thereof or downloading thereto via appropriate serial ports or other connections. Furthermore, the processor assembly 168 is preferably adapted to learn a specific hole pattern 190 using a polymeric sheet (e.g., Mylar—not shown) having the desired hole pattern 190 formed therein. The polymeric sheet (e.g., Mylar) may be overlaid on the stringer 12 and/or panel 26 after which the crawler assembly 10 may be manually indexed to each location in the hole pattern 190 for storing the hole pattern 190 for later implementation. The controller 148 may also be operative to download hole patterns via an Ethernet cable.

Referring still to FIGS. 21-22, the electronics module 140 cover may include a top main plate 154 cover for enclosing the components within the electronics module 140. The top main plate 154 cover may include a display 162 visible through a display window 164 for displaying the various settings and adjustable features of the crawler assembly 10. Furthermore, the display window 164 may comprise an operator interface 150 such as a keypad, pushbuttons and/or a touch screen for manually programming and/or controlling the operation of the crawler assembly 10. The electronics module 140 may include a handle 186 integrally formed into the lower frame 160 or into other portions of the electronics module 140 to facilitate positioning and transporting of the crawler assembly 10.

Operation of the crawler assembly 10 as illustrated in FIGS. 1-11 will now be described. In use, the elongate attachment mechanism 28 (i.e., rail 30) may be clamped to the upper flange 16 of the stringer 12 using the pair of clamping devices 40 illustrated in FIGS. 1-3. The opposing clamp levers 42 for each of the clamping devices 40 may be pivotally actuated into the downward position in order to force the clamping arms against an inner surface 22 of the upper flange 16 such that the attachment mechanism 28 is rigidly secured to the stringer 12.

Once the attachment mechanism 28 and the crawler assembly 10 are installed on the stringer 12, the normalizing mechanisms 106 may be installed. In the embodiment illustrated in FIGS. 1-11, the normalizing mechanisms 106 may comprise an opposing pair of stringer rollers 108 disposed on opposite sides of the vertical web 20 of the stringer 12. The stringer rollers 108 may be biased into position via a biasing mechanism 112 such as a compression spring that may be included in roller brackets 110 that support the stringer rollers 108. As shown in FIGS. 3, 5 and 11, a locking pin 114 may be inserted into the roller brackets 110 for maintaining the position thereof relative to the longitudinal slider 60. The biasing mechanism 112 may comprise a compression spring integrated into one or more of the roller brackets 110 for providing a normalizing force for maintaining a perpendicular orientation of the crawler assembly 10 relative to the stringer 12.

Referring still to FIGS. 1-11, using a hole pattern 190 and indexing from a reference feature 194 such as a pre-drilled hole or a surface feature, the drive mechanisms 120 (i.e., motors) of the longitudinal and lateral sliders 60, 74 are caused to move to a predetermined hole location 192 in response to control signals transmitted by the controller 148. As best seen in FIGS. 1, 2 and 4, the drive mechanisms 120 may be operatively coupled to the longitudinal and lateral sliders 60, 74 via an appropriate drive train 50 such as the rack 34 and pinion 122 and may cause the crawler assembly 10 to move the drill bushing 102 to the predetermined hole location 192 based on the reference feature 194. The brake mechanisms 130 for the longitudinal and lateral sliders 60, 74 provide a braking force to stop the drill bushing 102 at the predetermined hole location. Position feedback mechanisms 134 such as linear encoders 136 operatively coupled to the longitudinal and lateral sliders 60, 74 may provide information regarding the position of the drill bushing 102 to the controller 148 and may provide error-sensing feedback to the controller 148 to correct for errors (e.g., overshoot) in movement of the crawler assembly 10.

Once at the predetermined hole location, the operator may drill a hole using the drill bushing 102 as shown in FIG. 11. However, any number of a variety of machining operations may be performed. Following drilling of the hole at the predetermined hole location, the operator may indicate via the operator interface 150 that the crawler assembly 10 can be moved to the next predetermined hole location 192 of the hole pattern 190. The procedure may be repeated until the crawler assembly 10 moves to every location in the hole pattern 190.

Operation of the crawler assembly 10 as illustrated in FIGS. 12A-22 will now be described. The longitudinal friction drive 176 of the crawler assembly 10 may be mounted directly on the stringer 12 by first engaging the clamping devices 40 thereto. More specifically, the opposed pair of clamp levers 42 may be rotated or pivoted downwardly to cause the clamp arms 46 to engage an underside of the stringer 12.

As best seen in FIG. 13, the clamping device 40 may include the pair of clamping arms 40 each having at least one stringer roller 108 that is placed in bearing contact against opposing web surfaces of the stringer 12 for clamping the vertical web 20 between the stringer roller 108. The longitudinal friction drive 176 preferably includes a pair of the drive rollers 178 which are directly engageable to an outer surface 24 of the upper flange 16 of the stringer 12. The drive rollers 178 are disposable in rolling contact against the outer surface 24 of the stringer 12. One or more stringer rollers 108 are placed in bearing contact with the inner surface 22 of the stringer 12 when the clamp levers 42 are actuated. The stringer rollers 108 and drive rollers 178 are thereby clamped to the upper flange 16 such that the drive rollers 178 are maintained in constant contact with the upper flange 16.

As can be seen in FIG. 12A-14A, the longitudinal friction drive 176 may include a pair of torque knobs 142 which allow for adjustment of the height of the drive wheels to accommodate varying thicknesses in upper flange 16. In addition, the torque knobs 142 may include a biasing mechanism such as a compression spring 144 to facilitate adjustment of the clamping force against the upper flange 16. The torque knobs 142 may include bushings 54 which are insertable into bores 52 formed in the clamp bodies 44 as best seen in FIG. 12B.

The lateral slider 74 may optionally include a brake mechanism 130 to stop movement of the drill bushing 102 at the predetermined hole location. The drive rollers 178 of the longitudinal friction drive 176 may be directly coupled to the drive mechanism 120 or may pass through a gear box assembly for altering the rotational ratio of the drive mechanism 120 relative to the drive roller 178. The drive mechanism 120 of the lateral slider 74 may be operatively coupled to the fixture mounting bracket 94 for repositioning thereof. A brake mechanism 130 may be provided to apply a braking force as the drill bushing 102 arrives at the predetermined hole location.

Once the crawler assembly 10 is stopped at the predetermined hole location, a desired machining operation such as drilling a fastener hole may be performed using a drill motor 104 inserted into the drill bushing 102. Upon completion of the machining operation, the operator may use the operator interface 150 to prompt the controller 148 to move the drill bushing 102 to the next predetermined hole location 192.

Figure 23:
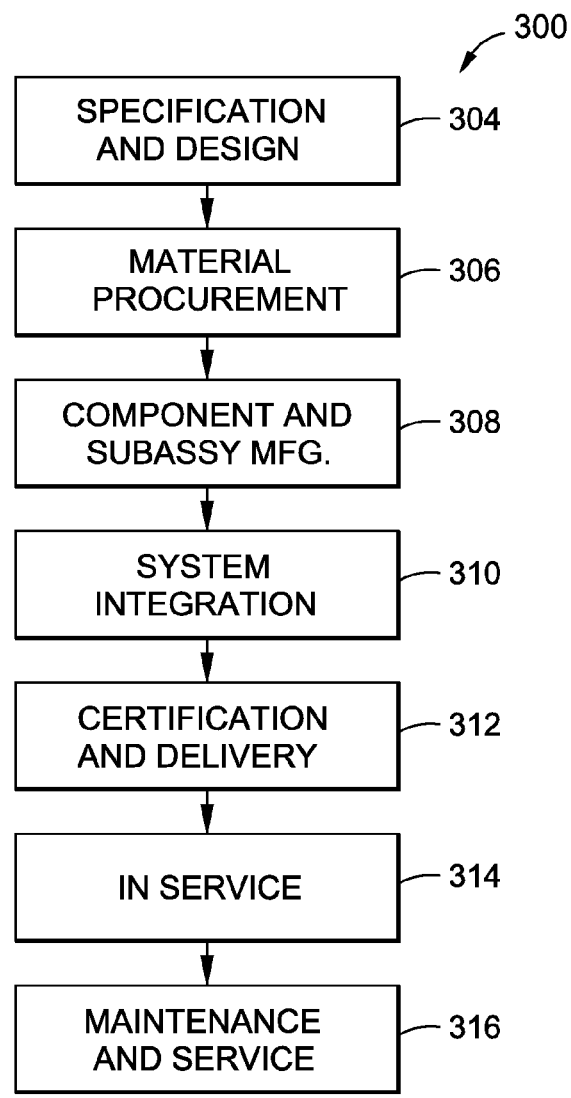
FIG. 23 is a flow diagram of an aircraft production and service methodology.
Figure 24:
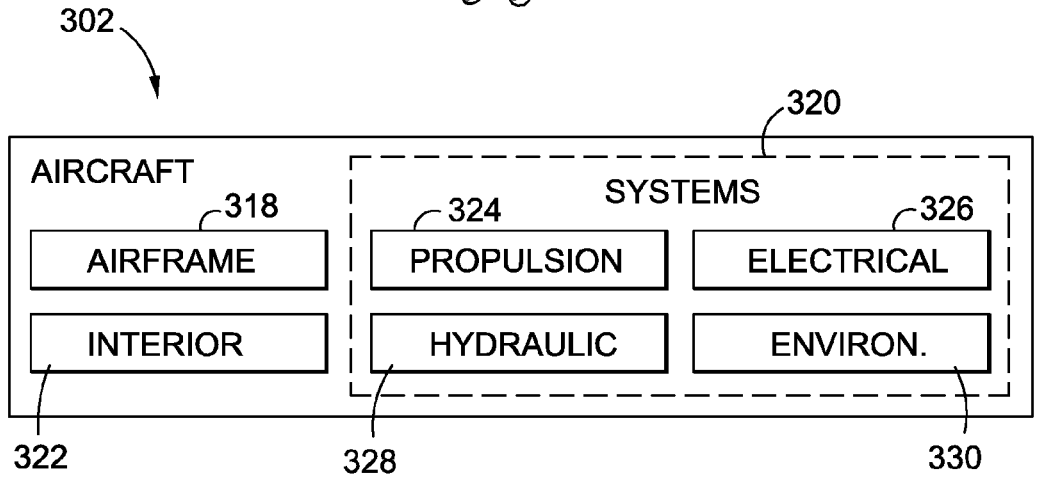
FIG. 24 is a block diagram of an aircraft.

Referring to FIGS. 23-24, embodiments of the disclosure may be described in the context of an aircraft manufacturing and service method 300 as shown in FIG. 23 and an aircraft 302 as shown in FIG. 24. During pre-production, exemplary method 300 may include specification and design 304 of the aircraft 302 and material procurement 306. During production, component and subassembly manufacturing 308 and system integration 310 of the aircraft 302 takes place. Thereafter, the aircraft 302 may go through certification and delivery 312 in order to be placed in service 314. While in service by a customer, the aircraft 302 is scheduled for routine maintenance and service 316 (which may also include modification, reconfiguration, refurbishment, and so on).

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 24, the aircraft 302 produced by exemplary method 300 may include an airframe 318 with a plurality of systems 320 and an interior 322. Examples of high-level systems 320 include one or more of a propulsion system 324, an electrical system 326, a hydraulic system 328, and an environmental system 330. Any number of other systems may be included. Although an aerospace example is shown, the principles of the disclosed embodiments may be applied to other industries, such as the automotive industry.

Apparatus and methods embodied herein may be employed during any one or more of the stages of the production and service method 300. For example, components or subassemblies corresponding to production process 308 may be fabricated or manufactured in a manner similar to components or subassemblies produced while the aircraft 302 is in service. Also, one or more apparatus embodiments, method embodiments, or a combination thereof may be utilized during the production stages 308 and 310, for example, by substantially expediting assembly of or reducing the cost of an aircraft 302. Similarly, one or more of apparatus embodiments, method embodiments, or a combination thereof may be utilized while the aircraft 302 is in service, for example and without limitation, to maintenance and service 316.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A crawler assembly engageable to a stringer having a vertical web and a longitudinal axis, comprising:
   an attachment mechanism removably attachable to the stringer;
   a longitudinal slider engageable to the attachment mechanism and having a normalizing mechanism disposable in bearing contact against the vertical web for maintaining an orientation of the longitudinal slider relative to the stringer, the longitudinal slider being operative to move in a direction parallel to the longitudinal axis; and
   a lateral slider mountable to the longitudinal slider and being movable in a direction perpendicular to the longitudinal axis, the lateral slider having a drill bushing mountable thereon;
   the longitudinal and lateral sliders cooperating to move the drill bushing to at least one predetermined hole location.

2. The crawler assembly of claim 1 wherein:
   the longitudinal slider has at least one clamping device for clamping the attachment mechanism to the stringer.

3. The crawler assembly of claim 1 wherein:
   each one of the longitudinal and lateral sliders includes at least one drive mechanism.

4. The crawler assembly of claim 3 further comprising:
   a controller configured to cause the drive mechanism to move the drill bushing toward the predetermined hole location.

5. The crawler assembly of claim 4 wherein:
   the controller is operative to index the drill bushing to a reference feature and cause the longitudinal and lateral sliders to move the drill bushing from the reference feature toward the predetermined hole location.

6. The crawler assembly of claim 1 wherein:
   the lateral slider is configured to move in a direction parallel to a plane defined by the vertical web and in a direction perpendicular to the longitudinal axis.

7. The crawler assembly of claim 1 wherein:
   the lateral slider is configured to move in a direction perpendicular to a plane defined by the vertical web and in a direction perpendicular to the longitudinal axis.

8. The crawler assembly of claim 1 further comprising:
   a normalizing mechanism for maintaining the crawler assembly into a predetermined orientation relative to the stringer.

9. The crawler assembly of claim 8 wherein:
   the normalizing mechanism comprises a pair of stringer rollers disposed on opposing sides of the vertical web.

10. A method of positioning a drill bushing at a predetermined hole location along a stringer, the method comprising the steps of:
    providing a crawler assembly having a normalizing mechanism and an attachment mechanism, the drill bushing being disposed on the crawler assembly;
    mounting the attachment mechanism to the stringer;
    mounting the crawler assembly to the attachment mechanism;
    placing the normalizing mechanism into contact with the stringer such that the crawler assembly is maintained in a predetermined orientation relative to the stringer; and
    driving the crawler assembly along the attachment mechanism such that the drill bushing is moved toward the predetermined hole location.

11. The method of claim 10 further comprising the steps of:
    indexing the drill bushing to a reference feature; and
    driving the crawler assembly toward the predetermined hole location based upon the reference feature.

* * * * *